US009688387B2

(12) United States Patent
Rawlings

(10) Patent No.: US 9,688,387 B2
(45) Date of Patent: Jun. 27, 2017

(54) COLOR APPLICATIONS FOR AERODYNAMIC MICROSTRUCTURES

(71) Applicant: The Boeing Company, Chicago, IL (US)

(72) Inventor: Diane C. Rawlings, Bellevue, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 14/705,564

(22) Filed: May 6, 2015

(65) Prior Publication Data

US 2016/0325824 A1 Nov. 10, 2016

(51) Int. Cl.
| | | |
|---|---|---|
| *B64C 1/38* | (2006.01) | |
| *B64C 21/10* | (2006.01) | |
| *B05D 5/06* | (2006.01) | |
| *B44F 1/02* | (2006.01) | |
| *B64C 23/00* | (2006.01) | |
| *B64D 45/00* | (2006.01) | |
| *G09F 19/00* | (2006.01) | |
| *B42D 25/324* | (2014.01) | |
| *B41F 15/00* | (2006.01) | |
| *B44B 5/00* | (2006.01) | |
| *G09F 19/12* | (2006.01) | |
| *G09F 21/08* | (2006.01) | |

(52) U.S. Cl.
CPC .............. *B64C 21/10* (2013.01); *B05D 5/063* (2013.01); *B05D 5/065* (2013.01); *B41F 15/00* (2013.01); *B42D 25/324* (2014.10); *B44B 5/0047* (2013.01); *B44F 1/02* (2013.01); *B64C 23/00* (2013.01); *B64D 45/00* (2013.01); *G09F 19/00* (2013.01); *G09F 19/12* (2013.01); *G09F 21/08* (2013.01); *B64C 2230/26* (2013.01)

(58) Field of Classification Search
CPC ....... B64C 1/38; B64C 2059/023; B64C 3/26; B64C 1/12; B29C 59/022
USPC .............................. 244/1 R, 129.1, 130, 200
See application file for complete search history.

(56) References Cited

U.S. PATENT DOCUMENTS

| | | | | |
|---|---|---|---|---|
| 4,650,138 | A | * | 3/1987 | Grose ..................... B64C 21/10 138/38 |
| 4,706,910 | A | | 11/1987 | Walsh et al. |
| 4,736,912 | A | | 4/1988 | Loebert |
| 4,865,271 | A | | 9/1989 | Savill |

(Continued)

FOREIGN PATENT DOCUMENTS

| | | |
|---|---|---|
| EP | 2070688 | 6/2009 |
| WO | 03000483 | 1/2003 |

OTHER PUBLICATIONS

United States Patent and Trademark Office, "Non-Final Office Action," issued in connection with U.S. Appl. No. 14/705,569, mailed on Jun. 21, 2016, 26 pages.

(Continued)

*Primary Examiner* — Richard G Davis
(74) *Attorney, Agent, or Firm* — Hanley, Flight & Zimmerman, LLC

(57) ABSTRACT

Color applications for aerodynamic microstructures are disclosed herein. One disclosed example apparatus includes an aerodynamic microstructure of a vehicle, sub-microstructures superimposed on the aerodynamic microstructure, and a color application defined on or within the microstructure.

20 Claims, 18 Drawing Sheets

(56) References Cited

U.S. PATENT DOCUMENTS

| | | | |
|---|---|---|---|
| 4,930,729 A | 6/1990 | Savill | |
| 4,932,612 A | 6/1990 | Blackwelder et al. | |
| 5,054,412 A | 10/1991 | Reed et al. | |
| 5,069,403 A | 12/1991 | Marentic et al. | |
| 5,133,516 A | 7/1992 | Marentic et al. | |
| 5,133,519 A | 7/1992 | Falco | |
| 5,445,095 A | 8/1995 | Reed et al. | |
| 5,505,543 A | 4/1996 | Webbeking et al. | |
| 5,520,717 A | 5/1996 | Miller et al. | |
| 5,637,873 A | 6/1997 | Davis et al. | |
| 5,766,306 A | 6/1998 | Olli et al. | |
| 5,766,764 A | 6/1998 | Olli et al. | |
| 5,860,626 A | 1/1999 | Moser | |
| 5,874,167 A | 2/1999 | Rawlings et al. | |
| 5,971,326 A | 10/1999 | Bechert | |
| 6,177,189 B1* | 1/2001 | Rawlings | C09J 7/026 156/304.3 |
| 6,191,248 B1 | 2/2001 | Rawlings et al. | |
| 6,345,791 B1* | 2/2002 | McClure | B63B 1/34 244/130 |
| 6,376,063 B1 | 4/2002 | Rasmussen et al. | |
| 6,475,616 B1 | 11/2002 | Dietz et al. | |
| 6,699,579 B2 | 3/2004 | Rasmussen et al. | |
| 6,958,207 B1 | 10/2005 | Khusnatdinov et al. | |
| 6,982,794 B1 | 1/2006 | Davis et al. | |
| 6,994,045 B2* | 2/2006 | Paszkowski | B63B 1/38 114/67 R |
| 7,041,363 B2 | 5/2006 | Krohmer et al. | |
| 7,044,073 B2 | 5/2006 | Goldstein | |
| 7,052,586 B2 | 5/2006 | Rasmussen et al. | |
| 7,070,850 B2 | 7/2006 | Dietz et al. | |
| 7,221,513 B2 | 5/2007 | Cho et al. | |
| 7,224,529 B2 | 5/2007 | King et al. | |
| 7,298,554 B2 | 11/2007 | Cho et al. | |
| 7,417,798 B2 | 8/2008 | King et al. | |
| 7,444,932 B2 | 11/2008 | Strand et al. | |
| 7,445,409 B2 | 11/2008 | Trice et al. | |
| 7,525,785 B2 | 4/2009 | Rawlings | |
| 7,544,407 B1 | 6/2009 | Rawlings et al. | |
| 7,678,997 B2 | 3/2010 | Rawlings | |
| 7,703,179 B2 | 4/2010 | Ferguson et al. | |
| 7,755,670 B2 | 7/2010 | Utagawa | |
| 7,757,591 B2 | 7/2010 | Trice et al. | |
| 7,807,229 B2 | 10/2010 | Rawlings et al. | |
| 7,864,501 B2 | 1/2011 | Rawlings et al. | |
| 7,867,621 B2 | 1/2011 | Rawlings et al. | |
| 7,931,841 B2 | 4/2011 | Huizinga et al. | |
| 7,940,462 B2 | 5/2011 | Noguchi et al. | |
| 8,038,102 B2 | 10/2011 | Miller et al. | |
| 8,113,469 B2 | 2/2012 | Lang | |
| 8,220,754 B2 | 7/2012 | McClure et al. | |
| 8,286,909 B2 | 10/2012 | Lee | |
| 8,292,226 B2 | 10/2012 | Sankrithi et al. | |
| 8,343,298 B2 | 1/2013 | Rawlings et al. | |
| 8,413,928 B2 | 4/2013 | Rawlings et al. | |
| 8,444,092 B2 | 5/2013 | Li et al. | |
| 8,460,779 B2* | 6/2013 | Gupta | B64C 21/10 428/156 |
| 8,578,747 B2 | 11/2013 | Li et al. | |
| 8,668,166 B2 | 3/2014 | Rawlings et al. | |
| 8,678,316 B2 | 3/2014 | Rawlings et al. | |
| 8,684,310 B2 | 4/2014 | Rawlings et al. | |
| 8,687,342 B2 | 4/2014 | Rawlings et al. | |
| 8,715,824 B2 | 5/2014 | Rawlings et al. | |
| 8,733,702 B1 | 5/2014 | Rawlings et al. | |
| 8,794,574 B2 | 8/2014 | Lang | |
| 8,870,124 B2 | 10/2014 | Ireland | |
| 8,876,052 B2 | 11/2014 | Rawlings et al. | |
| 9,017,797 B2 | 4/2015 | Goelling | |
| 9,272,791 B2 | 3/2016 | Brennan et al. | |
| 9,297,394 B2 | 3/2016 | Li et al. | |
| 9,352,533 B2 | 5/2016 | Rawlings et al. | |
| 9,371,141 B2 | 6/2016 | Rawlings et al. | |
| 2003/0133121 A1 | 7/2003 | Davis et al. | |
| 2004/0126541 A1 | 7/2004 | Dietz et al. | |
| 2004/0200932 A1 | 10/2004 | Scott et al. | |
| 2005/0094277 A1* | 5/2005 | Khusnatdinov | F41H 3/00 359/601 |
| 2005/0181203 A1* | 8/2005 | Rawlings | B32B 15/08 428/337 |
| 2006/0051592 A1* | 3/2006 | Rawlings | B32B 15/08 428/423.1 |
| 2006/0060722 A1 | 3/2006 | Choi et al. | |
| 2007/0060026 A1 | 3/2007 | Sung | |
| 2007/0194178 A1 | 8/2007 | Lang | |
| 2007/0257400 A1 | 11/2007 | Stenzel et al. | |
| 2008/0061192 A1 | 3/2008 | Sullivan | |
| 2008/0233356 A1 | 9/2008 | Loher et al. | |
| 2010/0080958 A1 | 4/2010 | Goelling | |
| 2010/0108813 A1 | 5/2010 | Lang | |
| 2010/0127125 A1* | 5/2010 | Li | B21B 1/227 244/119 |
| 2010/0187360 A1* | 7/2010 | Rawlings | B32B 3/30 244/130 |
| 2010/0187361 A1* | 7/2010 | Rawlings | B32B 3/08 244/130 |
| 2010/0282909 A1 | 11/2010 | Rawlings et al. | |
| 2010/0308177 A1 | 12/2010 | McClure et al. | |
| 2011/0006165 A1 | 1/2011 | Ireland | |
| 2011/0008174 A1 | 1/2011 | Ireland | |
| 2011/0073710 A1* | 3/2011 | Rawlings | B64C 21/10 244/130 |
| 2011/0186685 A1 | 8/2011 | Tsotsis et al. | |
| 2011/0262705 A1 | 10/2011 | Gupta et al. | |
| 2011/0274875 A1 | 11/2011 | Lang | |
| 2012/0025025 A1 | 2/2012 | Brennan et al. | |
| 2012/0227453 A1 | 9/2012 | Li et al. | |
| 2013/0028744 A1 | 1/2013 | Nordin et al. | |
| 2013/0062004 A1* | 3/2013 | Amirehteshami | B29C 70/78 156/245 |
| 2013/0107278 A1 | 5/2013 | Meyer et al. | |
| 2013/0193270 A1 | 8/2013 | Rawlings et al. | |
| 2013/0257055 A1 | 10/2013 | Simpson | |
| 2014/0023837 A1 | 1/2014 | Miller et al. | |
| 2014/0099475 A1 | 4/2014 | Rawlings et al. | |
| 2014/0110263 A1 | 4/2014 | Barbier et al. | |
| 2014/0116597 A1 | 5/2014 | Miller et al. | |
| 2014/0130318 A1 | 5/2014 | Rohr et al. | |
| 2014/0174642 A1 | 6/2014 | Rawlings et al. | |
| 2014/0238646 A1 | 8/2014 | Enright | |
| 2014/0242285 A1 | 8/2014 | Pettersson et al. | |
| 2014/0248453 A1 | 9/2014 | Li et al. | |
| 2014/0248469 A1 | 9/2014 | Rawlings et al. | |
| 2014/0255632 A1 | 9/2014 | Gradert et al. | |
| 2014/0272237 A1 | 9/2014 | Roper et al. | |
| 2014/0295143 A1 | 10/2014 | Rawlings et al. | |
| 2014/0332631 A1 | 11/2014 | Rawlings et al. | |
| 2014/0356219 A1 | 12/2014 | Gammel et al. | |
| 2014/0363637 A1 | 12/2014 | Kovach et al. | |
| 2015/0017385 A1 | 1/2015 | Lang | |
| 2015/0053289 A1 | 2/2015 | Kurtovic et al. | |
| 2015/0136909 A1 | 5/2015 | Kruckenberg et al. | |
| 2016/0107371 A1 | 4/2016 | Hurme et al. | |
| 2016/0159466 A1 | 6/2016 | Daggett et al. | |
| 2016/0168685 A1 | 6/2016 | Surply et al. | |
| 2016/0243586 A1 | 8/2016 | Travis | |
| 2016/0271930 A1 | 9/2016 | Roper et al. | |
| 2016/0325818 A1 | 11/2016 | Williams et al. | |
| 2016/0325823 A1 | 11/2016 | Rawlings et al. | |

OTHER PUBLICATIONS

European Patent Office, "Extended European Search Report," issued in connection with European Patent Application No. 16167099.7, issued on Nov. 11, 2016, 8 pages.

European Patent Office, "Extended European Search Report," issued in connection with European Patent Application No. 16167118.5, issued on Nov. 11, 2016, 8 pages.

United States Patent and Trademark Office, "Non-Final Office Action," issued in connection with U.S. Appl. No. 14/705,569, mailed on Feb. 1, 2017, 26 pages.

(56) References Cited

OTHER PUBLICATIONS

European Patent Office, "Extended Search Report," issued in connection with European Patent Application No. 16162961.3, issued on Sep. 13, 2016, 9 pages.
United States Patent and Trademark Office, "Final Office Action," issued in connection with U.S. Appl. No. 14/705,569, mailed on Oct. 14, 2016, 22 pages.
United States Patent and Trademark Office, "Non-Final Office Action," issued in connection with U.S. Appl. No. 14/705,547, mailed on Nov. 3, 2016, 40 pages.
United States Patent and Trademark Office, "Non-Final Office Action," issued in connection with U.S. Appl. No. 14/705,569, mailed on Feb. 1, 2017 (11 pages).

* cited by examiner

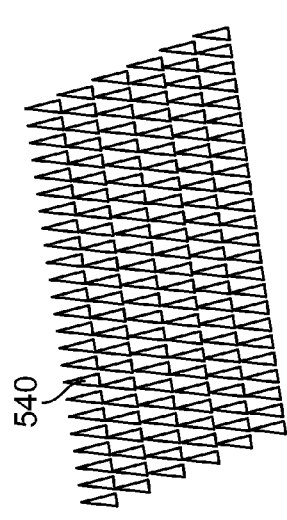
FIG. 5A
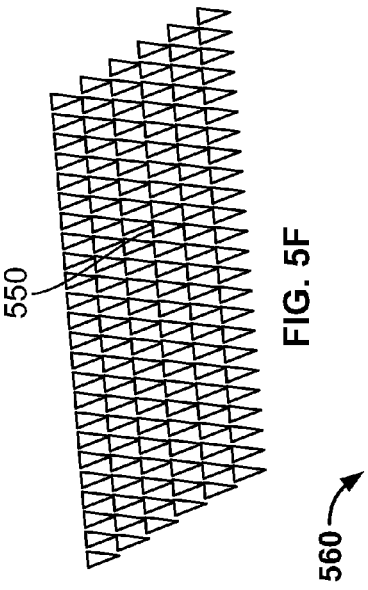
FIG. 5B
FIG. 5C
FIG. 5D
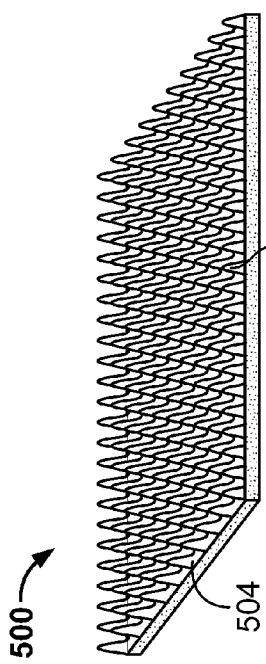
FIG. 5E
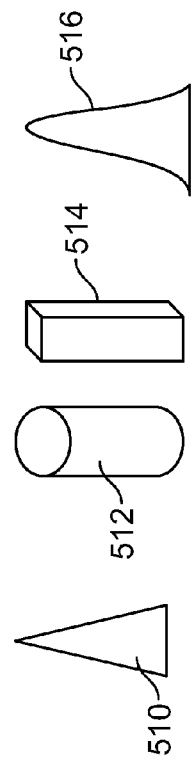
FIG. 5F
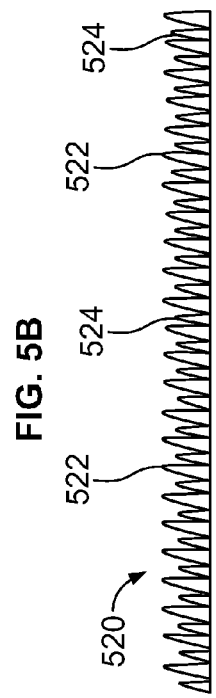
FIG. 5G
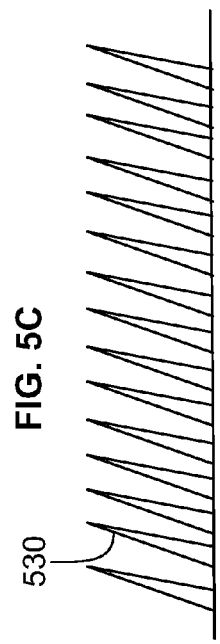

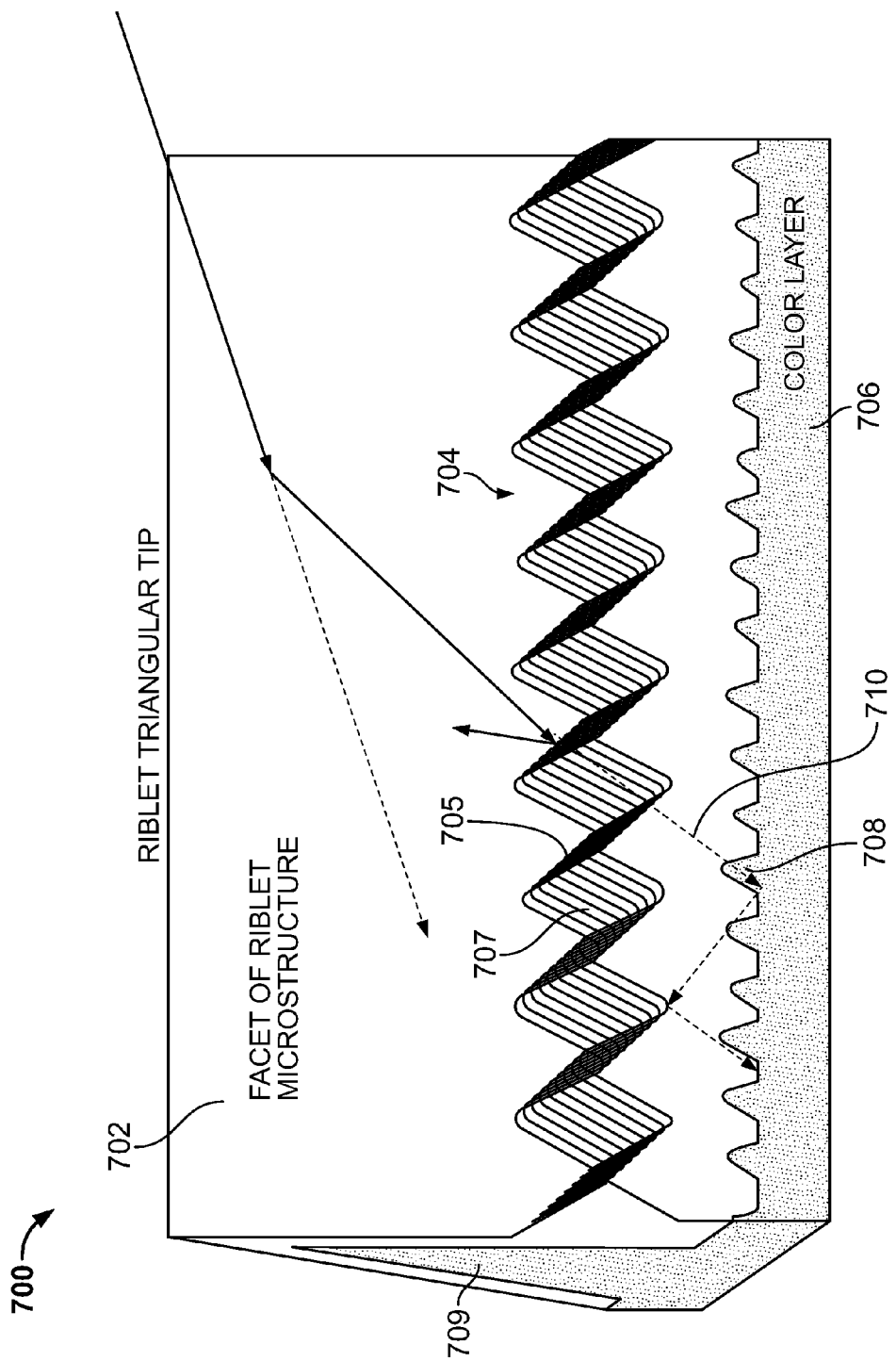

COLOR APPLICATIONS FOR AERODYNAMIC MICROSTRUCTURES

FIELD OF THE DISCLOSURE

This patent relates generally to microstructures and, more particularly, to color applications for aerodynamic microstructures.

BACKGROUND

Microstructures are typically used on an aircraft to alter flight characteristics and/or dynamics of the aircraft. In particular, microstructures such as riblets are used on surfaces of an aircraft wing, a fin or a fuselage to reduce drag and/or a drag coefficient of the aircraft, which can result in overall fuel savings and/or reduction in carbon-dioxide emissions, etc. However, riblets and other microstructures can also cause or prevent certain optical/aesthetic/visual effects including high reflectivity, directional reflectiveness, and/or other potential effects to the aesthetics of the aircraft based on their geometry. High reflectivity and the associated directional reflectiveness is often referred to as glint, which can affect the visibility and/or an aesthetic look of an aircraft. Riblets may cause glint in atypical directions due to their geometries, shapes and/or features in comparison to typical aircraft surfaces (e.g., wing surfaces, fuselage surfaces, etc.).

In some situations, reflectivity and/or the overall appearance of the aircraft surfaces may be controlled by adjusting the reflectivity and/or reflection angles from different portions of the aircraft surfaces. Some known solutions to affect the appearance of the aircraft surfaces include low reflectivity optical coatings such as a flat black paint or multilayer film coatings. Other known solutions to alter the reflectivity and/or the appearance of the aircraft include decals, but applying these to aerodynamic surfaces such as riblets can have negative impacts on the aerodynamic properties of the riblets and, thus, may reduce the riblet effectiveness.

SUMMARY

An example apparatus includes an aerodynamic microstructure of a vehicle, sub-microstructures superimposed on the aerodynamic microstructure, and a color application defined on or within the microstructure.

An example method includes using a vehicle, where sub-microstructures are superimposed on an aerodynamic microstructure of the vehicle, and where a color application is applied to the microstructure.

Another example method includes providing sub-microstructures on an aerodynamic microstructure of a vehicle, and providing a color application to a surface of the microstructure or within the microstructure.

BRIEF DESCRIPTION OF THE DRAWINGS

FIGS. 5A-5G illustrate example shapes that may be used to implement microstructures as well as sub-microstructures that may be superimposed on microstructures.

FIG. 7A is a view of another example microstructure with sub-microstructures superimposed on a base surface of the example microstructure and having additional sub-microstructures at an interface.

Figure 1:
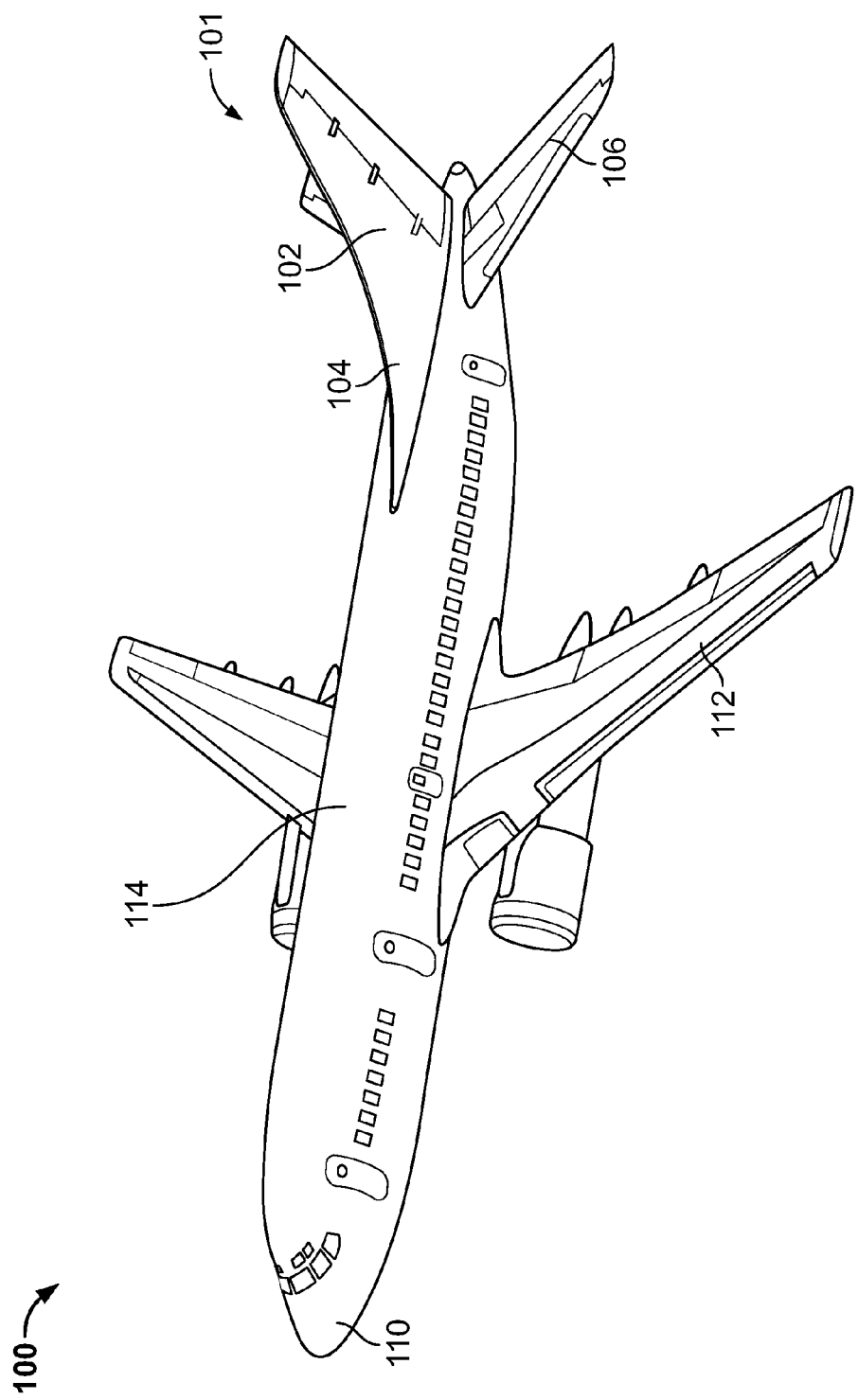
FIG. 1 illustrates an example aircraft that may be used to implement the example methods and apparatus disclosed herein.

Wherever possible, the same reference numbers will be used throughout the drawing(s) and accompanying written description to refer to the same or like parts. As used in this disclosure, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Color applications for aerodynamic microstructures are disclosed herein. Microstructures such as riblets, for example, are typically used on aerodynamic surfaces of an aircraft to alter and/or improve flight characteristics to reduce an overall drag of the aircraft, for example, and, thus, may result in in overall fuel savings and/or reduction in carbon-dioxide emissions, etc. However, these riblets and other aerodynamic microstructures can also cause certain associated and/or unintended optical/visual effects including changing the reflectivity at certain angles and/or viewing angles, thereby potentially causing undesirable glints, and/or other potential effects to the aesthetics of the aircraft (e.g., gloss, color effects, color distortions, etc.).

Aircraft and/or external microstructures associated with the aircraft such as riblets may have finished, smooth and/or polished surfaces, which have high reflectivity and may result in Fresnel reflections that can cause glint and/or affect the overall appearance of the aircraft. However, in accordance with the teaching of this disclosure, different riblet and/or riblet surfaces may be provided a color application that conveys a representation of an image and/or indicia to affect the appearance of the aircraft and/or alter reflectivity of the aircraft, etc. In some examples, sub-microstructures and microstructures with fine tips can provide color dispersion effects to give a surface an added iridescent or rainbow-like appearance.

The examples disclosed herein may utilize sub-microstructures (e.g., nanostructures) and/or sub-microstructure patterns, which may or may not be nano-scale (e.g., approximately on a scale of $10^{-9}$ meters in dimension(s)), superimposed on or under microstructures (e.g., external aerodynamic microstructures) with a color application. This color application may be used to show indicia and/or control reflections (e.g. Fresnel reflections, etc.), for example. In particular, sub-microstructures (e.g., sub-microstructures with or without interspersed relatively flat portions and/or different sub-microstructure portions) may be used with such color applications to control reflectivity of the aircraft and/or a manner or degree in which the color application (e.g., a color layer) is viewed by an observer. In some examples, the microstructures in which the examples are implemented on are riblets applied to a vehicle (e.g., an aircraft, a land based vehicle, a submarine, etc.). These riblets are used for drag coefficient reduction of the vehicle. In some examples, sub-microstructures along with relatively flat portions and color applications (e.g., surface coloring, an integrated or embedded color layer, an added color layer or surface, etc.) are used to customize the optics and/or aesthetics of surfaces or features of the vehicle (e.g., an aircraft) on which the example microstructures are provided.

The examples disclosed herein allow control of visual appearances including displaying a color layer and/or reflectiveness at certain areas of vehicle surfaces to reduce or increase reflections and/or glint from various locations or positions to achieve desired optical effects. The examples disclosed herein also enable implementation of customized optical effects on the vehicles. In particular, some examples allow certain aesthetic features such as an image, indicia and/or a color layer to be viewed from certain pre-defined angles by limiting or increasing reflectivity or transmissivity at certain positions and/or viewing angles relative to portions of a viewable external surface of a vehicle, for example. In examples where a color application such as a color layer is used, the color layer may be mechanically coupled to microstructures, integral with the microstructures and/or used in conjunction with sub-microstructures for different decorative and/or reflective effects. In some examples, a color application (e.g., an external color layer) is applied an outer surface of a sub-microstructure. In some examples, a color application and/or a microstructure may have interface features (e.g. a textured surface) between the color application and the microstructure and/or microstructure portions for different/varied optical, aesthetic and/or decorative effects such as light refractive effects and/or diffractive effects from the microstructure and/or layers (e.g., color layers) embedded within the microstructure. In some examples, the color application is used to convey a representation of an image and/or indicia by conveying graphics and/or graphics sets, etc. In some examples, a thin film coating may be used to increase the index of refraction difference at a material-air or material-material interfaces to enhance diffraction effects.

In some examples, to modify the appearance of a microstructure, sub-microstructures and/or groups of sub-microstructures are provided to the microstructure by machining or any other appropriate processing. In particular, the sub-microstructures may be formed on the microstructure via roll-forming or embossing processes, for example. In some of the examples disclosed herein, the sub-microstructures are formed on a microstructure as the microstructure is extruded (e.g., an inline secondary process). Providing and/or creating sub-microstructures may occur via direct surface modification or indirectly via creation of a tool for roll-forming or embossing, or by extrusion molding, casting, spraying, etching, etc. In some examples a color application is printed and/or applied to a microstructure (e.g., via an applique or coloring, etc.) to a microstructure and/or a surface of the microstructure. In some examples, thin film coatings may be applied by sputtering, chemical vapor deposition, physical vapor deposition, casting, or by other known processes. These film coatings may be applied to the product, to the tooling, or to surfaces that define product internal interfaces.

As used herein, the term "microstructure" may refer to geometric features, dimensions and/or distances between geometric features (e.g., periodic distances, heights and/or widths, etc.) having sizes of approximately 10-200 microns, but typically 75-125 microns. As used herein, the term "sub-microstructure" may refer to geometric features, dimensions and/or distances in which geometric features (e.g., periodic or non-periodic distances, heights and/or widths, etc.) are significantly smaller than a microstructure. In these examples, sub-microstructures may have sizes of approximately 0.1-10 microns. Some sub-microstructures, which are sometimes referred to as "nanostructures," may range in size and/or distance (e.g., a periodic distance) at approximately equal to, or less than, a wavelength of visible light, which is about 0.4-0.7 microns. Thus, the term "sub-microstructure" may also refer to dimensions less than about 0.4 microns. Therefore, for the terms "microstructure" and "sub-microstructure" as used herein, the phrase "approximately a wavelength of light" means a dimension that can range from about 0.1-10 microns. As used herein, the term "color application" may refer to a color layer (e.g., an embedded color layer, disconnected color regions/volumes, an internal color layer, etc.), color applied to an outer surface or colored elements (e.g., dyes, etc.) infused into one or more of the layers. A color application may also include, in some examples, diffractive color effects created and/or defined by microstructure design/geometry. The term "color application" does not necessarily mean more than one color and, thus, may apply to an image or indicia using a single color or multiple colors.

FIG. 1 illustrates an example aircraft 100 in which the examples disclosed herein may be implemented. The aircraft 100 of the illustrated example includes a tail section 101 including a vertical fin 102 adjacent to a dorsal fairing 104, horizontal stabilizers 106, a nose section (e.g., a cockpit section) 110 and wings 112 attached to a fuselage 114. The examples described herein may be applied to surfaces and/or features (e.g., riblets) of any of the tail section 101, the nose section 110, the stabilizers 106, the wings 112 and/or the fuselage 114, or any other exterior or outboard structure (e.g., a wing strut, an engine strut, a canard stabilizer, etc.) and/or surface.

Figure 2:
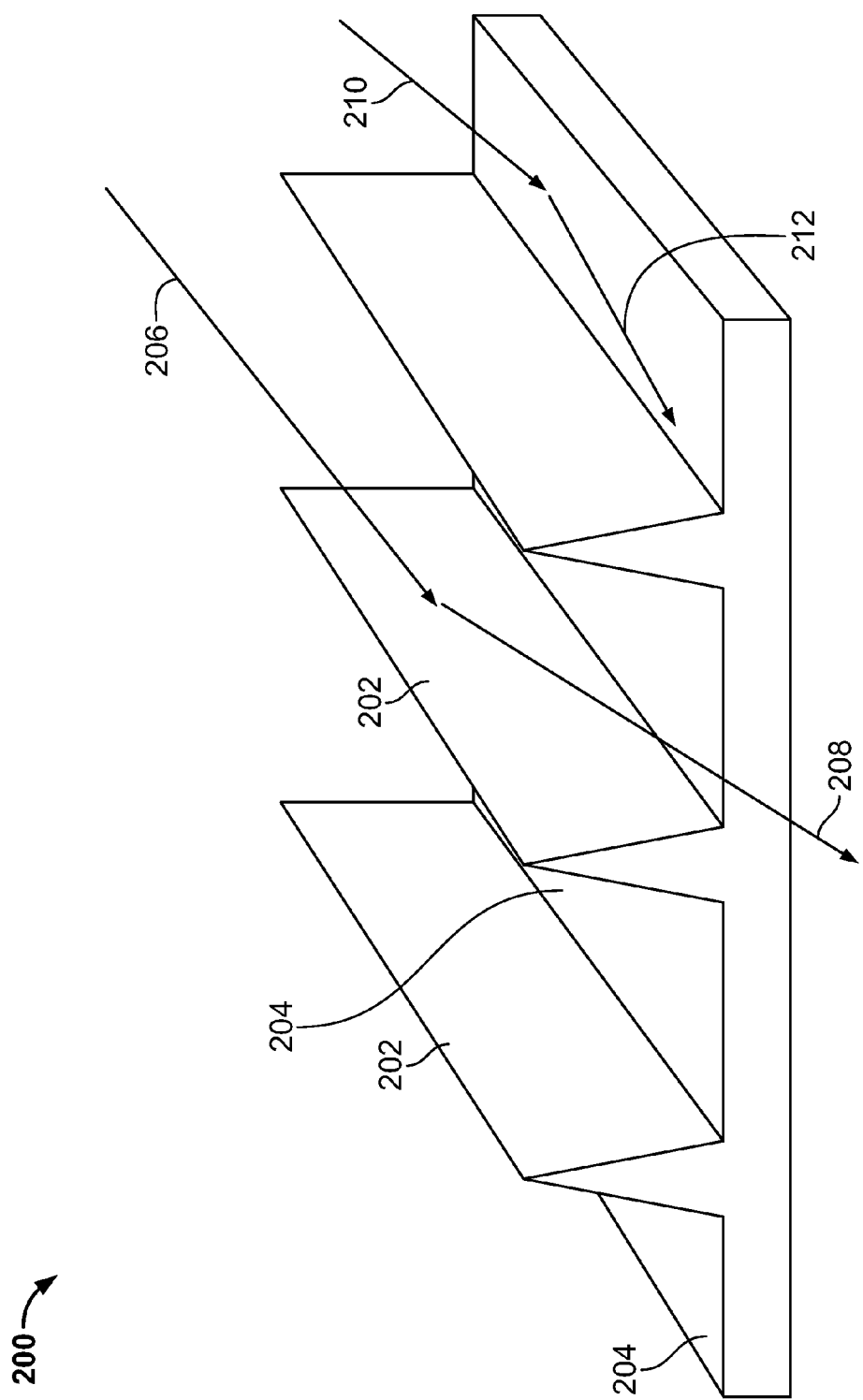
FIG. 2 is an example riblet microstructure from an external surface of the example aircraft of FIG. 1 on which the examples disclosed herein may be implemented.

FIG. 2 is an example microstructure 200 from an external surface of the example aircraft 100 of FIG. 1 on which the examples disclosed herein may be implemented. The microstructure 200 of the illustrated example includes ridges 202, which are spaced apart from one another, and base surfaces (e.g., valleys, aircraft surfaces, etc.) 204 that space the ridges 202 apart from one another. In this example, the profiles of the ridges 202 are generally triangular, thereby defining ridges having generally triangular cross-sections. A profile of the microstructure 200 is extruded to define the microstructure 200 (e.g., a defined volume of the microstructure 200). While the example microstructure 200 is extruded in this example, the example microstructure 200 may be formed by embossing, casting, pressing, thermo-forming, machining, etc. In other examples, the base surfaces 204 may have ridges that are smaller than the ridges 202 (e.g., less than a third of the height of the ridges 202) to control glint.

In this example, the microstructure 200 is a riblet of the aircraft 100 and is used to alter the aerodynamic characteristics of the aircraft 100 by reducing an overall drag of the aircraft 100, for example, and may be located on any external surface of the aircraft 100. The microstructure 200 of the illustrated example is used to reduce aerodynamic drag by controlling the turbulent boundary layers and/or preventing cross-flows associated with a turbulent boundary layer in air near an external surface of the aircraft 100. In particular, the example microstructure 200 has the ridges 202 and is installed on the external surface of the aircraft 100 and aligned with a desired direction of airflow. This alignment allows the ridges 202 to act as small fences or guides that disrupt and reduce lateral airflow motions near the external surface to enhance in-line turbulent airflow and reduce skin friction from the external surface, thereby reducing overall drag of the aircraft 100. In some examples, the microstructure 200 is not attached or installed on the external surface during or after manufacturing of the aircraft 100 but, rather, is integral with the external surface. For example, the microstructure 200 may be pre-formed into or on the external surface (e.g., machined or molded onto a skin surface, built into a composite cured part, robotically placed, etc.) instead of being coupled (e.g., mechanically adhered) to the external surface.

The overall geometry of the microstructure 200 may cause directional (e.g., forward-scattering or back-scattering) reflections, generally, and/or an optical phenomenon known as glint, which can affect the overall appearance of the aircraft 100. Glint occurs most commonly when light strikes a surface at certain angles near the surface (e.g., incident angles far from the surface normal) causing light rays to reflect onward (e.g., forward scattering) from surfaces and/or facets of the microstructure 200 toward certain viewing angles and/or positions relative to the microstructure 200 and the aircraft 100. Incident light may strike the surface from direct illumination, or from a reflection from another surface. In some examples, this reflectance may cause glint at certain viewing angles and/or positions relative to the microstructure 200 and, thus, affect the overall appearance of the aircraft 100. As seen in the view of FIG. 2, an incident light ray 206 may strike one of the ridges 202 nearly parallel to the ridge surface and, thus, a reflection 208 travels onward towards the base surfaces 204, where the reflected light ray 208 may be absorbed, transmitted, or reflected. Similarly, a ray 210, for example, may result in a reflection 212 from the base surfaces 204 towards a surface of one of the ridges 202. The reflections 208, 212 are sometimes referred to as grazing angle light reflections because they are reflections resulting from incident rays that graze (strike the surface at angles far from normal) the surface and can cause undesirable and/or an unintended appearance of the aircraft 100.

Figure 3:
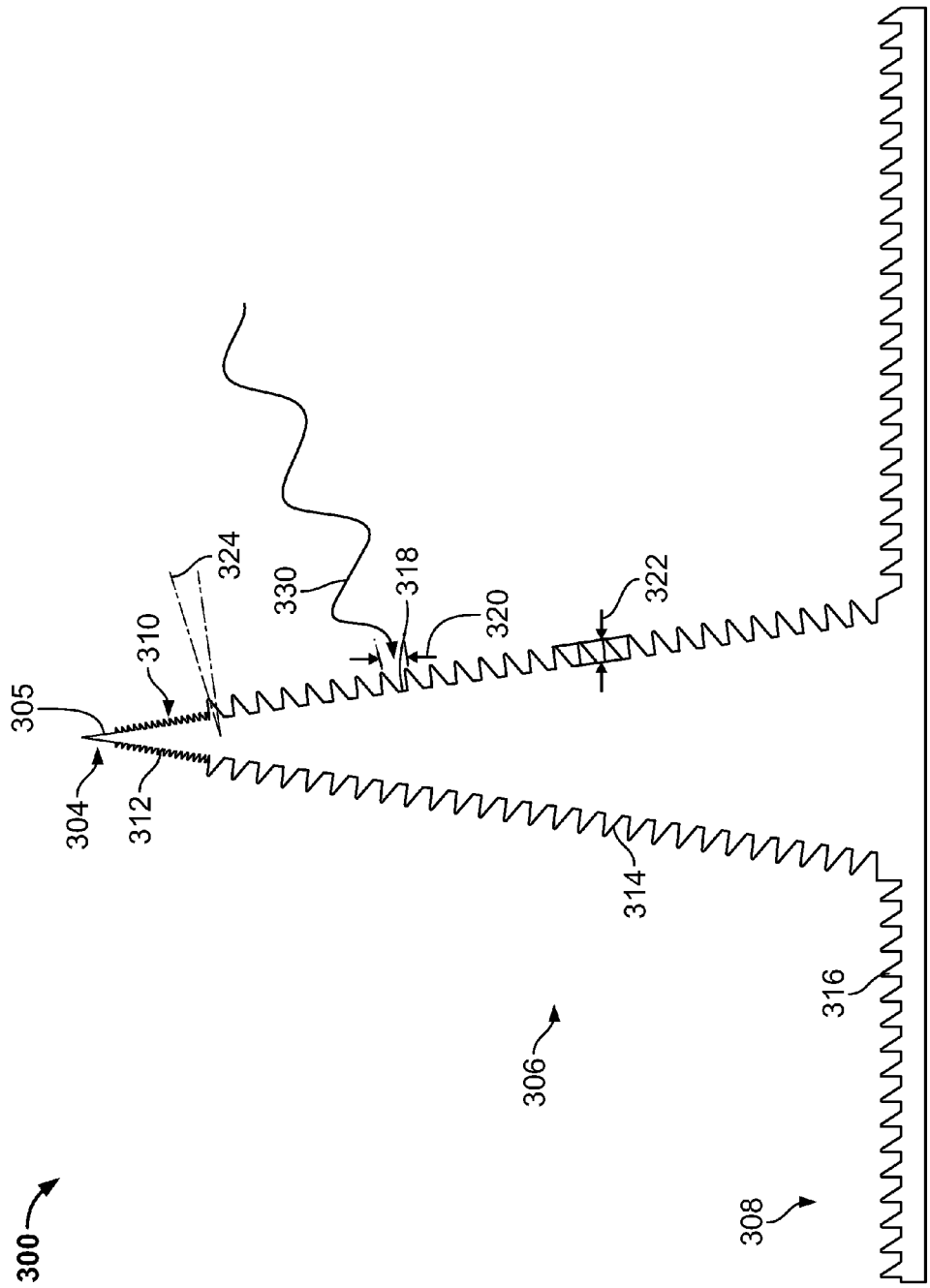
FIG. 3 is a cross-sectional view of an example microstructure with a superimposed sub-microstructure in accordance with the teachings of this disclosure.

FIG. 3 is a cross-sectional view of a microstructure (e.g., a riblet, an extruded riblet) 300 having superimposed sub-microstructures (e.g., nanoridges, sub-microstructure patterns, etc.) in accordance with the teachings of this disclosure. The microstructure 300 of the illustrated example has different portions, which include a distal portion 304 with a tip 305, an intermediate portion 306 and a base portion 308. In this example, the distal portion 304 is separated from the intermediate portion 306 by a transition portion 310, in which the sub-microstructures may transition (e.g., gradually transition) from one size to another. The transition portion 310 has sub-microstructures 312 and the intermediate portion 306 has sub-microstructures 314. Likewise, the base portion 308 of the illustrated example has sub-microstructures 316. In some examples, the tip 305 may be too small to have sub-microstructures superimposed onto the tip 305. However, in some examples, nano-scale sub-microstructures may be superimposed proximate and/or on the tip 305.

Each of the sub-microstructures 312, 314, 316 of the illustrated example has characteristic features. For example, the sub-microstructure 314 has characteristic features including base surfaces (e.g., valleys) 318, a spacing (e.g., periodic, non-periodic) 320, peak heights 322 and slope angles (e.g., an angle relative to a surface or facet of the microstructure 300) 324. In this example, a light ray 330 is shown being directed towards the intermediate portion 306. In this example, a wavelength of the light ray 330 is similar to the distance 320 and as the light ray 330 travels towards the sub-microstructures 314, a portion of the light ray 330 is transmitted to one of the base surfaces 318 and another portion of the light ray 330 is reflected from the sub-microstructures 314. As a result of the wavelength of the light ray 330 being approximately similar in size to the spacing 320, a significant portion of the light ray 330 is absorbed by the sub-microstructures 314 and, thus, the portion of the light ray 330 reflected from the sub-microstructures 314 is significantly reduced and/or eliminated, thereby reducing reflections and/or glint produced by the light ray 330. Conversely, spacing between the sub-microstructures 314 may be increased at certain portions to increase the portion of the light ray 330 that is reflected from the sub-microstructures 314. Additionally, because the sub-microstructures 314 have ridges with relatively smoothly increasing ridge width towards the base surfaces 318 (e.g., the sub-microstructures 314 are wider at their base in comparison to their respective tips) and distances on the order of a wavelength of visible light, they create a gradient index of refraction on a surface of the microstructure 300. Alternatively, the overall width varying shape of the microstructures 314 towards the base surfaces 318 facilitates light components reflecting from the microstructure 314 (e.g., Fresnel reflections).

The example sub-microstructures 312 of the distal portion 304 of the transition portion 310 have relatively smaller peak heights and spacing distances (e.g., periodic distances) in comparison to the sub-microstructures 314 and/or the sub-microstructures 316. Thus, in a manner similar to the sub-microstructures 314 described above, the sub-microstructures 312 of the illustrated example reduce and/or minimize reflections or glint resulting from incident light rays. In this example, the sub-microstructures 312 are relatively smaller and more densely packed together in comparison to the sub-microstructures 314 to retain a certain aerodynamic smoothness of the microstructure 300. In particular, larger sub-microstructures in the transition region 310 and/or near the tip 305 may cause increased drag and/or turbulence. In this example, the sub-microstructures 312 do not extend into the tip 305 to prevent durability issues, damage and/or premature structural failure of the microstructure 300. Further, in some examples, sub-microstructures located near a distal end of a microstructure or a transition region near the distal end are relatively smaller (e.g., height and/or periodic distance(s), etc.) for greater ease of manufacturability and/or based on manufacturing constraints.

In this example, the sub-microstructures 316 have peak heights and distances similar to the sub-microstructures 314. Alternatively, the peak heights and/or the distances of the sub-microstructures 316 may vary in comparison to the sub-microstructures 314 and/or the sub-microstructures 312. In some examples, the sub-microstructures 316 may differ from the sub-microstructures 314 in some locations, but have a transition gradient where the sub-microstructures 316 adjacent the sub-microstructures 314 have similar dimensional characteristics similar to those of the sub-microstructures 314, but vary further from the sub-microstructures 314. Likewise, the sub-microstructures 314 may have a transition gradient to the sub-microstructures 312 and vice-versa.

While the sub-microstructures 312, 314, 316 are shown protruding generally perpendicular to surfaces of the microstructure 300 in some locations, any of the sub-microstructures 312, 314, 316 may be angled and/or shaped relative to the respective surfaces of the microstructure 300 (e.g., they may be slanted) from which they extend. In some examples, such angling of the sub-microstructures 312, 314, 316 increases ease of manufacturability (e.g., tool removal in machining, casting or molding processes, etc.) of the sub-microstructures 312, 314, 316. Further, angling the sub-microstructures 312, 314, 316 relative to the surfaces of the microstructure 300 may allow for different visual effects, reflection angles for light rays incident on the microstructure 300 and/or ability to retain or absorb a color application to be provided to the microstructure 300. In some examples, such angling and/or shaping may also allow reflections to be viewed at only certain angles (e.g., viewing angles) relative to the microstructure 300.

While the example sub-microstructures 312, 314, 316 are also shown in FIG. 3 as having substantially regular patterns (e.g., distances between individual sub-microstructures are relatively similar) and/or relatively uniform heights among individual sub-microstructures, characteristics of the sub-microstructures 312, 314, 316 may vary over portions of the microstructure 300. In particular, any of the sub-microstructures 312, 314, 316 may define patterns based on variation within or between the sub-microstructures 312, 314, 316. For example, to define a pattern, the distance (e.g., the periodic distance) 320 of the sub-microstructures 314 may vary from the base portion 308 to the tip 305 (e.g., lengthening or shortening of the distance 320 and/or lengthening or shortening of the peak heights 322). Additionally or alternatively, the overall shape, geometry and/or structure(s) of superimposed sub-microstructures may vary over different portions of the microstructure 300 (e.g., ridge-shaped sub-microstructures in one portion and cone-shaped sub-microstructures in another portion of a microstructure) to define a pattern (e.g., a superimposed pattern). Variation of sub-microstructures superimposed on a microstructure along with relatively flat portions adjacent or near the sub-microstructures, in some examples, may be used to define patterns that allow for visual and/or aesthetic effects. Additionally or alternatively, these variations may be combined with a color application. As a result, images and/or indicia, which can be colored, may be conveyed through a pattern of sub-microstructures (e.g., a pattern of superimposed sub-microstructures) in which the sub-microstructures vary between different microstructures and/or portions of a microstructure. For example, different sub-microstructure groups, each group having different heights, spacing and/or orientation may be used to show/convey a specifically defined aesthetic look or an image. Alternatively, a pattern of sub-microstructures along with relatively flat surfaces may be used to convey the images and/or the indicia. Additionally or alternatively, any of the sub-microstructures 312, 314, 316 may have randomly distributed peak heights and/or spaces between individual sub-microstructures.

In some examples, a color application is applied to any of the sub-microstructures 312, 314, 316. For example, the sub-microstructures 312, 314, 316 may be colored (e.g., applied with a coloring agent, painted, color treated, color infused, etc.) at different portions to convey a representation of an image and/or indicia. Additionally or alternatively, the color application may added to the microstructure 300 as a color layer or pattern, for example, which may be applied below the microstructure 300 or applied externally to one or more surfaces of the microstructure 300 (e.g., base surfaces at the base portion 308, etc.) to convey a representation of an image or indicia. In some examples, the geometry and/or angle of the sub-microstructures 312, 314, 316 control and/or vary aspects of how the color layer and/or a color application that is applied externally (e.g., on or adjacent sub-microstructures of a microstructure) is viewed by an observer.

While the microstructure 300 of the illustrated example is ridge-shaped, the microstructure 300 may be any appropriate shape or geometry, including any of the shapes and/or any combination of the shapes described below in connection with FIGS. 5A-5F. Similarly, while the sub-microstructures 312, 314, 316 are shown as having a substantially triangular ridge shaped profile or cross-section in FIG. 3, they may be any appropriate shape including any of the shapes and/or any combination of the shapes or geometries associated with FIGS. 5A-5F shown below.

In some examples, coatings to control and/or vary reflections may be applied to the microstructure 300, any of the sub-microstructures 312, 314, 316, and/or any of the interfaces between materials and/or layers. For example, the microstructure 300 and/or the sub-microstructures 312, 314, 316 may be coated with an anti-reflective coating, a reflective coating and/or colored coatings (e.g., paints, inks or dye infusion) in their entirety and/or partially coated on a single side or facet to control the reflection of light in a pre-defined direction and/or viewing angle(s) and, thus, define an appearance of the microstructure 300 and/or a color application on or within the microstructure 300. In some examples, coatings are only applied to portions of the microstructure 300 (e.g., the base portion 308, the intermediate portion 306 and/or the distal portion 304) and/or portions of the sub-microstructures 312, 314, 316 (e.g., upwardly facing surfaces of the sub-microstructures 314, etc.).

Figure 4:
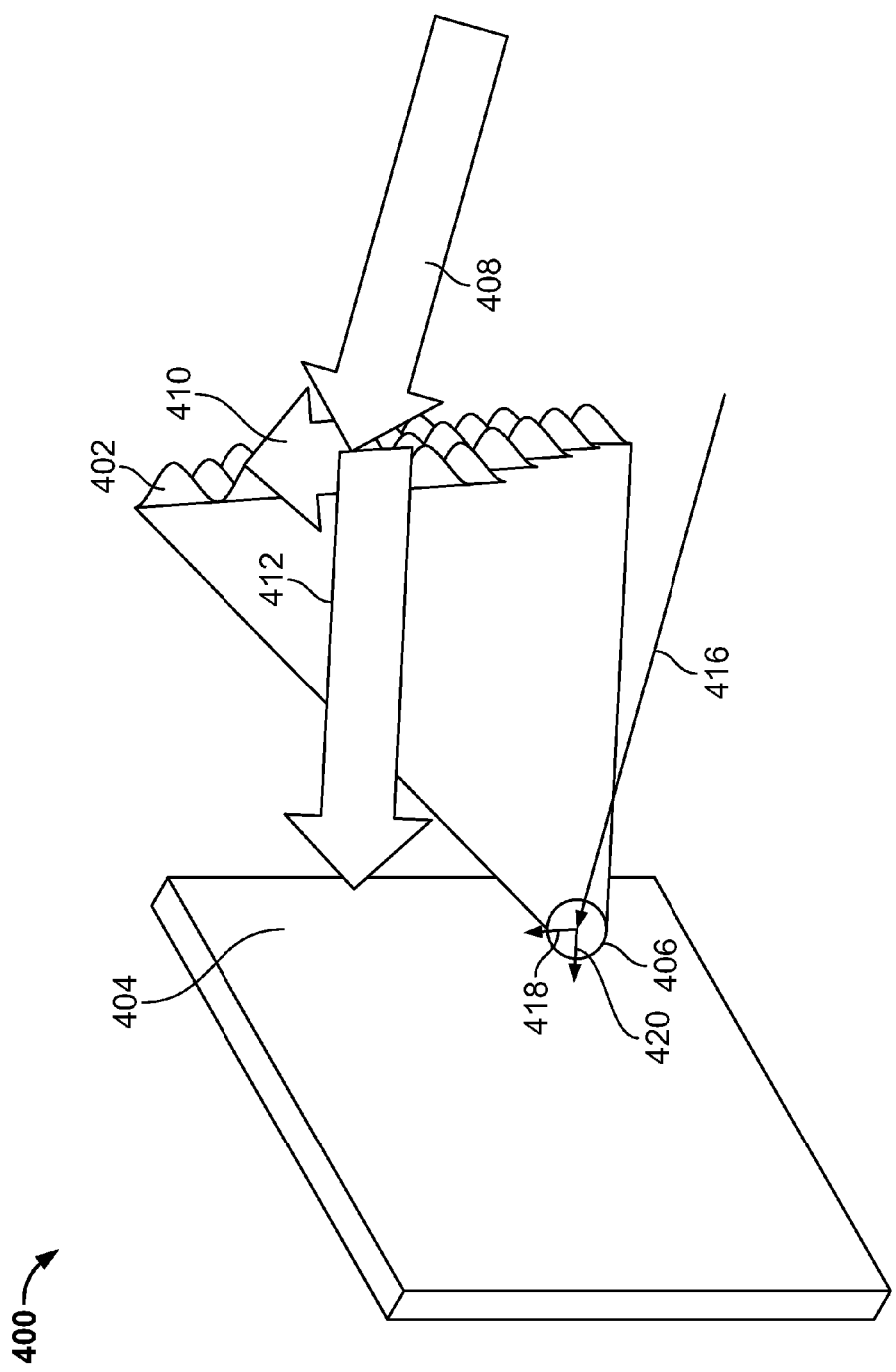
FIG. 4 illustrates an example surface section of another example microstructure with a superimposed sub-microstructure that may be smaller than the wavelength of light.

FIG. 4 illustrates an example microstructure 400 with superimposed sub-microstructures (e.g., nanostructures) 402 on a surface 404. In this example, the microstructure 400 and the superimposed sub-microstructures 402 are both polymer and, thus, define an air-polymer interface 406 for incident light rays. In contrast to the sub-microstructures 312, 314, 316 described above in connection with FIG. 3, the sub-microstructures 402 of the illustrated example have rounded cone-like protrusions sometimes referred to as a motheye geometry. The example microstructures 402, which extend generally perpendicular to the surface 404, have associated characteristic dimensions (e.g., are separated by distances, have corresponding pitch distances, etc.) similar to or on the order of the wavelength of incident light (e.g., less than the wavelength of light) and/or aspect ratios defined between distances and heights of sub-microstructures superimposed on a microstructure.

In this example, an arrow 408 represents a general direction of an incident light ray directed towards the sub-microstructures 402. As a result of being directed towards the sub-microstructures 402, the example incident light ray is divided into a smaller reflected portion represented by an arrow 410, and a larger transmitted and/or absorbed portion, which is coupled into the material, based on the material properties and is represented by an arrow 412. The arrows 408, 410, 412 of the illustrated example are also represented by arrows 416, 418, 420, respectively, which are shown relative to the surface 404. In this example, the arrow 418 is reflected and the arrow 420 is transmitted and refracted. However, the sub-microstructures 402 of the illustrated example significantly reduce the intensity of Fresnel reflection(s) by creating a gradual change in refractive index from air to a material of the microstructure 400 and, thus, may affect the appearance of the surface 404. In particular, varying the sub-microstructures 402 (e.g., heights, spacing, orientation and/or shapes of the sub-microstructures 402) at different locations (e.g., defining sub-microstructure groups where the groups have different sub-microstructure characteristics) may allow an image to be conveyed, for example.

In some examples, a color application may be applied to the sub-microstructures 402 and/or internal to (e.g., below, within, embedded etc.) the surface 404. For example, a color layer may be below the surface 104 and the sub-microstructures 402 may affect and/or control how an observer views the color layer by altering an amount of light transmitted toward the color layer and/or angles in which light is reflected from the color layer.

FIGS. 5A-5G illustrate examples of geometries (e.g., shapes) that may be used for microstructures as well as sub-microstructures (e.g., nanostructures) that may be superimposed onto microstructures and/or on which a color application may be applied. The example shapes of FIGS. 5A-5G may also be utilized as any combination of these shapes and/or any other appropriate shape for both microstructures and sub-microstructures. In particular, the shapes shown in FIGS. 5A-5G may be superimposed onto one another (e.g., as sub-microstructures superimposed onto a microstructure, etc.). For example, an example protrusion 540 of FIG. 5E may be superimposed as a sub-microstructure onto an example protrusion 562 or the gap 564 of FIG. 5G and vice-versa. In some examples, different shapes such as the shapes of FIGS. 5A-5G are used in combination to convey an image and/or indicia. Additionally or alternatively, the different shapes and/or combinations of the shapes (e.g., at different portions or depths) affect a degree to which light and/or reflections affect how a color application of a microstructure and/or a sub-microstructure is viewed (e.g., light reflections, color combinations of different structures, combinations of structures and/or layers with different colors, etc.).

FIG. 5A depicts an example protrusion (e.g., a bump, a protrusion from a base surface, etc.) shape 500 that may be used to implement the example microstructures and/or sub-microstructures described herein. The example protrusion shape 500 also has a corresponding bump profile (e.g., a cross-sectional shape) 504, which may vary along multiple directions, and which may be sinusoidal, parabolic, triangular, or any other appropriate geometry. In example microstructures with a parabolic-shaped profile, sub-microstructures may be superimposed onto the parabolic-shaped microstructure closer to the tip of the microstructure as opposed to a triangular-shaped microstructure. In some examples, sub-microstructures placed near a tip of the triangular-shaped microstructure may cause structural weakness and/or may not be possible due to manufacturing constraints (e.g., a tool may not pull away from the triangular-shaped microstructure without damaging the sub-microstructures near the tip).

FIG. 5B depicts example geometries, which are shown as individual shapes and may be applied to microstructures or sub-microstructures. The example geometries include a triangular shape 510, a cylindrical shape 512, a rectangular shape 514, and a sinusoidal and/or parabolic shape 516. The triangular shape 510 may be a cone, a pyramidal shape or a triangular ridge, for example. In general, the example geometries of FIG. 5B may be shape profiles with corresponding depths (e.g., a two-dimensional shape with a defined depth to be extended or extruded) or a three-dimensional shape such as a cone. For example, the parabolic shape 516 may be extruded/extended as a cross-section or may be revolved around an axis to have a three-dimensional parabolic shape.

FIG. 5C depicts an example geometry 520 with varying heights, which may be applied to microstructures or sub-microstructures. The geometry 520 of the illustrated example includes peaks 522 and sub-peaks 524, which may be arranged in a relatively regular pattern (e.g., an alternating pattern) or may not be arranged in a regular pattern (e.g., a random distribution). Alternatively, a predefined number of sub-peaks 524 may be located in spans between the peaks 522 (e.g., three sub-peaks 524 between the peaks 522 in one or more directions, etc.). In any of these examples, the arrangement of the peaks 522 and the sub-peaks 524 relative to one another may allow different optical effects to convey an image, a color application and/or glint reduction. In some examples, the sub-peaks 524 may be microstructures or sub-microstructures.

FIG. 5D depicts a two-dimensional or three-dimensional example slant geometry 530 that may allow for improved and/or desired optical effects and/or greater manufacturing ease via a simplified tool release, for example. The slant geometry 530 of the illustrated example may be implemented as a microstructure or a sub-microstructure. For example, a sub-microstructure with a slant geometry may be superimposed onto a microstructure having a slant geometry.

FIG. 5E depicts three-dimensional protrusions 540 with a pattern that extends (e.g., protrudes) from a surface. In this example, the protrusions 540 have a cone-like shape. The protrusions 540 of the illustrated example may have rectangular facets and/or be cones having circular cross-sections. While the illustrated example of FIG. 5E shows cone-like shapes, any appropriate shape may be used including those described in the examples disclosed herein. In some examples, three-dimensional parabolic functions (e.g., revolved parabolic functions) may be used to define three-dimensional protrusions.

FIG. 5F depicts three-dimensional indentations 550 on a surface. The example indentations 550 may be any appropriate shape, including those described herein. For example, the indentations may be oval-like or circular indentations (e.g., bump indentations), holes, ridges and/or grooves, etc. In some examples, a combination of the three-dimensional indentations 550 and cone-like protrusions such as the cone-like geometry 540 of FIG. 5E may be used to define a shape of a microstructure or a sub-microstructure with unique optical characteristics.

FIG. 5G depicts a pattern 560 in which protrusions (e.g., triangular ridges) 562 are separated by gaps (e.g., planar gaps) 564, which is similar to the microstructure 200 of FIG. 2. In this example, the protrusions 562 are spaced at substantially similar or equal distances to one another. However, in other examples, the spacings between the protrusions 562 may vary (e.g., may be irregular) to improve manufacturability (e.g., tool separation) and/or for certain desired optical effects. In some examples, the gaps 564 are curved, have multiple segments and/or are contoured.

Figure 6:
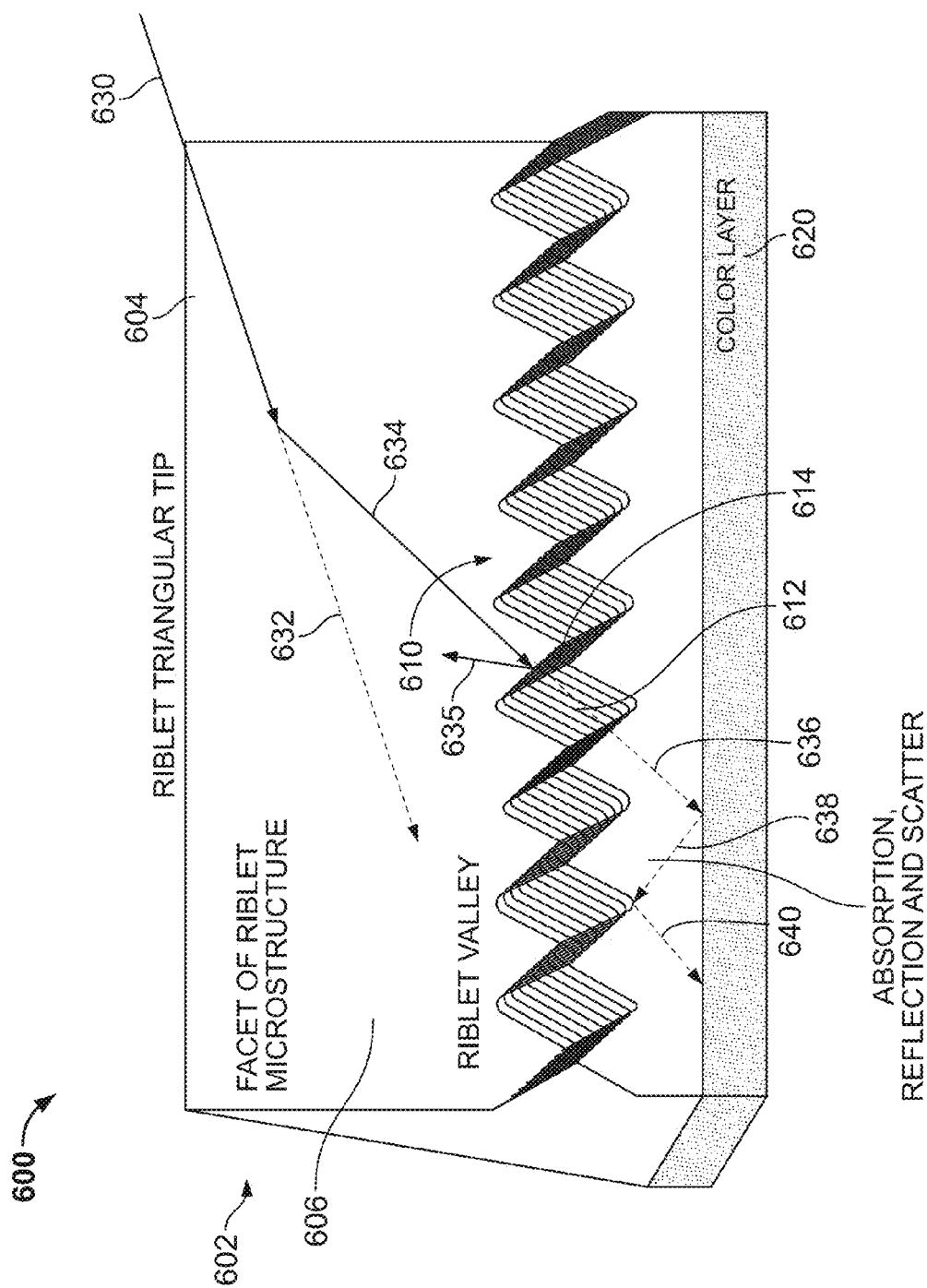
FIG. 6 is a view of another example microstructure with sub-microstructures superimposed on a base surface of the example microstructure.

FIG. 6 is a view of another example microstructure 600, which is a riblet in this example. The example microstructure 600 includes a microstructure ridge (e.g., a riblet ridge) 602 with a generally triangular-shaped tip 604 and a surface (e.g., a facet) 606 of the ridge 602. The example microstructure 600 includes sub-microstructure ridges 610 that extend across a base of the microstructure 600 between (e.g., span between) the riblet ridge 602 and another adjacent riblet ridge. In this example, the sub-microstructure ridges 610 are sub-microstructures provided on the base of the microstructure 600 and also include ridge surfaces (e.g., facets) 612, 614 adjacent to one another and defining peaks of the ridges 610. In some examples, the ridge surfaces 612, 614 are at different slope angles from a vertical line relative to one another (e.g., the ridge surfaces 612, 614 are at different angles relative to a vertical line in the view shown in FIG. 6). The microstructure 600 and the sub-microstructure ridges 610 of the illustrated example are adjacent a color layer 620.

In this example, the riblet ridge 602 and the sub-microstructure ridges 610 extend in generally perpendicular directions relative to one another. In other examples, the example sub-microstructure ridges 610 may be substantially parallel or at an angle relative to the riblet ridge 602. In some examples, a surface, which spans between the ridge 602 and the adjacent ridge, has contours that may be relatively flat, curved and/or angled between the riblet ridge 602 and the adjacent riblet edge and, thus, the sub-microstructure ridges 610 may follow such contours. In some examples, the sub-microstructure ridges 610 are oriented at different angles relative to the riblet ridge 602 for different optical effects including glint reduction effects (e.g., glint reduction for a specific range of viewing angles relative to the example microstructure 600, etc.), to convey an image or indicia, and/or may be manufactured from material that is colored (e.g., previously colored) or color infused.

The microstructure 600 of the illustrated example is mechanically coupled and/or attached to the color layer 620. In some examples, the color layer 620 is integral with the microstructure 600. In some examples, the color layer 620 may be a portion of the microstructure that is colored (e.g., coated, etc.) and/or added to the microstructure 600 during a secondary process (e.g., a layering process, etc.). In some examples, the color layer 620 has multiple colors and/or graphics to convey a representation of an image to an observer. In some examples, the color from a color application viewed by an observer may result from dispersion effects created by light diffraction and/or interference effects of light scattered from sub-microstructures created in, or coated with, an index of refraction that is significantly higher or lower than the surrounding materials.

In the illustrated example of FIG. 6, the microstructure 600 is semi-translucent, fully translucent (e.g., transparent or partially transparent, etc.), or transparent. In particular, the example microstructure ridge 602 and the sub-microstructure ridges 610 may allow at least a portion of light to travel therethrough, while reflecting another portion of the light based on the refractive light index of the mediums, and incident angles at the interfaces, through which the light travels. In this example, an incident light ray 630 is directed towards the surface 606 of the microstructure ridge 602. The incident light ray 630 of the illustrated example has a resulting transmitted component 632 that is absorbed in and/or travels through the ridge 602. The incident light ray also has a reflected component 634 that is directed towards the sub-microstructure ridges 610. In some examples, the incident ray 630 is at least partially absorbed in the microstructure ridge 602 via sub-microstructures (e.g., the sub-microstructures 312, 314, 316, 402) superimposed onto the surface 606. Varying a degree to which rays are absorbed at different locations may allow a representation of an image to be conveyed to an observer. In some examples, the microstructure ridge 602 and/or the sub-microstructure ridges 610 are used to control reflective viewing angle(s) and/or transmitted light to the color layer 620.

The reflected component 634 of the illustrated example is an incident ray onto the sub-microstructure ridges 610. The incident ray 634, strikes the sub-microstructure facet 614, thereby creating another reflected ray 635 that is directed back to the microstructure surface 606, where it may be scattered, transmitted therethrough and/or absorbed, thereby affecting an appearance of the example microstructure 600 and/or the color layer 620. Additionally, a resulting transmitted component 636 is coupled into the microstructure base layer and directed towards the color layer 620, in which a reflection portion 638 may then be reflected towards the surfaces 612, 614, and another portion 640 may be absorbed or scattered within the base of the microstructure 600. Such absorbing and/or scattering may further affect the appearance of the example microstructure 600 by re-directing the portion 640 into multiple directions. In some examples, directing reflected portions towards other sub-microstructures (e.g., sub-microstructures on the surface 606) may also further affect the appearance (e.g., routing reflected light components towards sub-microstructures).

As mentioned above, in some examples, sub-microstructures on the surface 606, for example, may be controlled to vary the amount of light reflected towards the sub-microstructure ridges 610 at different positions of the sub-microstructure ridges 610. In some examples, the ridges 610 and/or the surfaces 612, 614 have sub-microstructures superimposed thereon. In some examples, the ridges 610 and/or the surfaces 612, 614 have multiple groups of different sub-microstructures to affect the appearance of the microstructure 600 and/or convey an image and/or indicia to an observer.

Additionally or alternatively, either of the surfaces 612, 614 may be a reflective (e.g., mirrored) surface and/or have reflective portions to control the magnitude and direction of the reflected light to further control the aesthetics and/or provide further capabilities to convey an image. While the ridges 610 are sub-microstructures in this example, they may be microstructures (e.g., dimensions having larger than sub-microstructures as described herein), but still are relatively smaller in comparison to the microstructure 600. It has been determined that relatively smaller secondary microstructures placed between (e.g., at base surfaces between) primary microstructures and approximately a third of the size and/or spacing of the primary microstructures may also control and/or reduce glint to affect the overall look of the microstructure 600. Thus, the sub-microstructure ridges 610, in some examples, may instead be microstructures, which may or may not have sub-microstructures superimposed thereon. Such microstructures may have dimensions (e.g., heights, heights below or above a base surface) such as a height approximately a third of a height or width of the microstructure ridge 602 (or smaller) to effectively control glint or alter the overall appearance of the microstructure 600.

FIG. 7A is a view of another example microstructure 700 with a ridge 702 and ridges 704 that includes surfaces 705, 707. The microstructure 700 of the illustrated example is similar to the example microstructure 600 of FIG. 6, but instead has a textured color layer 706 with sub-microstructures 708 that define a textured interface between the color layer 706 and the rest of the microstructure 700 instead of a relatively flat interface, as shown in the example microstructure 600 of FIG. 6. In some examples, the color layer 706 has a portion (e.g., an extension, a protrusion, etc.) 709 that extends and/or partially extends into the riblet tip 702. In some examples, the color layer 706 has multiple layers created for color effects (e.g., multilayer think film coatings to create an iridescent appearance). In this example, a transmitted ray 710 is reflected from a surface of the ridge 702 and then transmitted through the sub-microstructure surface 705 into the base layer may be absorbed and/or scattered by the sub-microstructures 708, for example. In particular, the sub-microstructures 708 may be spaced apart at distances similar to the wavelength of visible light. In this example, the portion 709 of the color layer 706 that extends into the ridge 702 may affect the amount of light scattered and/or absorbed, or affect a manner in which the color layer 706 appears to a viewer. Additionally or alternatively, in a similar manner, the color layer 706 may extend into the ridges 704 (e.g., at least partially match the contours of the ridges 704), for example. In some examples, the color layer 706 has a textured interface at an interface in which the color layer 706 extends into the riblet tip 702 and/or the ridges 704. The textured interface may also affect how light is reflected from the color layer 706, thereby affecting an appearance of the microstructure 700 to an observer.

In some examples, the sub-microstructures 708 and/or a roughness associated with the sub-microstructures 708 is used to enhance coupling to the microstructure base color layer 706 and/or a degree to which light is reflected from the color layer 706. In particular, the sub-microstructures 708 enhance optical and mechanical coupling to the microstructure 700 by increasing contact surface area between the color layer 706 and the microstructure 700. In some examples, the surfaces 705, 707 may be reflective (e.g., mirrored). Additionally or alternatively, only the surfaces 705 may be reflective while the surfaces 707 may be at least semi-translucent (e.g., translucent, transparent, etc.) and vice-versa. Making only a portion of the surfaces reflective allows control of reflectivity and/or light absorption from different viewing angles and may be used to convey an image, indicia, and/or a color application. In some examples, the sub-microstructures 708 may not be sub-microstructures and may instead be larger textured features on the order of microstructure dimensions. Additionally or alternatively, the sub-microstructures 708 may diffract light into specific colors and/or angles to create desirable optical and/or aesthetic effects (e.g., to convey images) including dispersing light spectrally (e.g., spread out into multiple colors to create a rainbow-type effect).

Figure 7B:
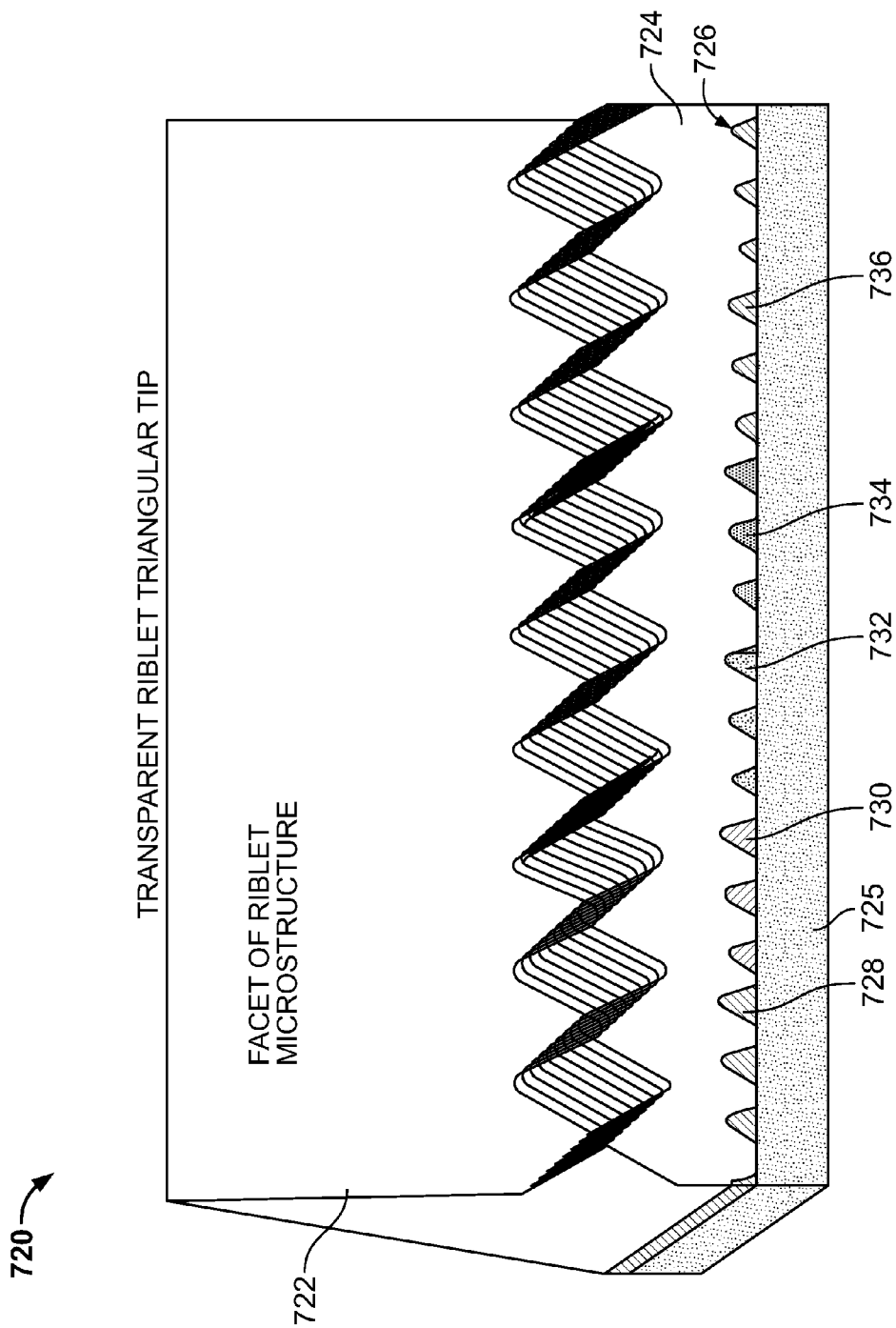
FIG. 7B is a view of another example microstructure with sub-microstructures superimposed on a base surface of the example microstructure, but with a color texture interface at the base.

FIG. 7B is a view of another example microstructure 720, but with a color application texture interface at the base. The example microstructure 720 includes a ridge 722, sub-microstructures 724, and a base layer 725 that defines a color texture interface 726. In this example, the color texture interface 726 includes a first color portion 728, a second color portion 730, a third color portion 732, a fourth color portion 734 and a fifth color portion 736, all of which may be used to define and/or partially define an image and/or indicia to be conveyed to an observer. While five color portions are shown in the illustrated example of FIG. 7B, any appropriate number of color portions may be used (one, two, ten, one hundred, one thousand, etc.). In some examples, geometric shapes or materials of the ridge 722 and/or the sub-microstructures 724 may affect the way in which an observer may view the color texture interface 726 and/or create a diffractive effect, for example. In some examples, the color texture interface 726 defines sub-microstructures. However, in other examples, the color texture interface 726 may be larger than sub-microstructures in spacing, height and/or width, etc. While the color texture interface 726 is shown as ridge-like structures in the example of FIG. 7B, in some examples, the texture interface 726 may define pixel-like structures (e.g., cylinders, cones, etc.) and/or shapes such as those described in FIGS. 5A-5G to enable high resolution images to be conveyed from the color texture interface 726. Additionally or alternatively, the base layer 725 may be colored and/or colored at different locations to convey an image and/or convey a portion of an image (e.g., a background and/or background image, etc.) in combination with the color texture interface 726 to an observer, for example.

Alternatively, in some examples, a color application is defined at and/or applied to a bottom surface (e.g., a bottom surface of a microstructure that is mounted to an external surface of an aircraft) instead of the color texture interface 726. In some examples, the color application applied to the bottom surface is added as an applique. Alternatively, the ridge 722 and/or the sub-microstructures 724 are colored or applied with a colorant, dye or dye infusion. In some examples, additionally or alternatively, a color application may be printed (e.g., directly printed) onto the bottom surface (e.g., ink jet printing onto the bottom surface, etc.).

Figure 8A:
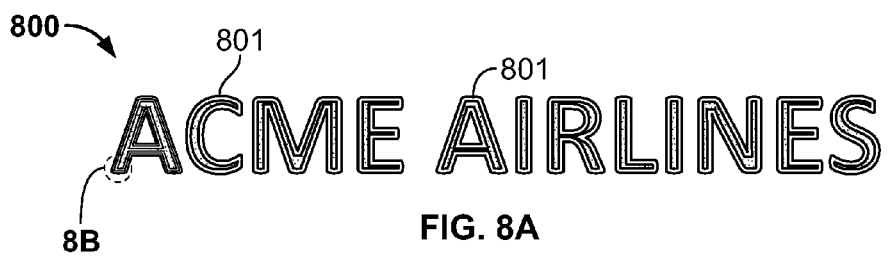
FIG. 8A illustrates example indicia that are formed by sub-microstructures.

FIG. 8A illustrates example indicia (e.g., a logo, letters, symbols, etc.) 800 formed by groups of sub-microstructures. In this example the indicia 800 and corresponding lettering 801 are formed by a pattern defined by a combination of different sub-microstructure groups and/or relatively flat areas of a vehicle surface. In some examples, images may be projected onto microstructures by superimposing different sub-microstructures (e.g., nanostructures) across surface(s) of the microstructures, or at other visible interfaces beneath surfaces of the microstructures. In some examples, a single sub-microstructure group (e.g., a particular size and/or shape of sub-microstructures) is used in combination with relatively flat areas to convey a representation of an image and/or indicia.

Figure 8B:
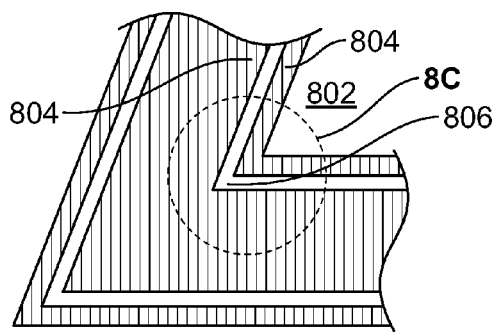
FIG. 8B is a detailed view of the example indicia of FIG. 8A.

FIG. 8B is a detailed view of the example indicia 800 of FIG. 8A. In the view of FIG. 8B, the indicia 800 includes a relatively flat portion 802, a first sub-microstructure portion 804 and a second sub-microstructure portion 806. In this example, the combination of the first and second sub-microstructure portions 804, 806 creates a visually perceptible image to an observer. This image is perceived because of the different reflective properties between the first and second sub-microstructure portions 804, 806. In particular, the different reflective properties result from differences in alignment (e.g., ridge alignment) and/or spacing between the sub-microstructure portions 804, 806. While a logo is shown in this example, the examples disclosed herein may be used to create relatively complex images (e.g., graphics, photos, etc.), a diffractive effect, and/or a holographic effect. In some examples, the relatively flat portion 802 is used to enhance the visual effect created by the sub-microstructure portions 804, 806 by providing a contrasting feature or colors, and/or enhancing a perceived depth of the image conveyed by the observer. Alternatively, in some examples, an image may be conveyed primarily by a difference in spacing, height, shape and/or orientation between different sub-microstructure groups. As will be described below in greater detail with FIG. 8E, in some examples, a color application such as a color layer is applied below (e.g., embedded in a surface below) the flat portion 802, the sub-microstructures 804 and/or the sub-microstructures 806 to provide color to the indicia 800.

Figure 8C:
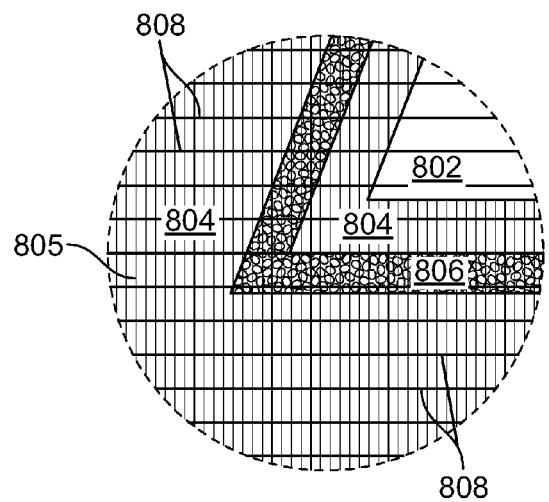
FIG. 8C is a detailed view of a portion of the view of FIG. 8B.

FIG. 8C is a detailed view of a portion of the view of FIG. 8B. In this example, the sub-microstructure portion 804 is defined and/or partially defined by ridges (e.g., sub-microstructure ridges) 805 that extend throughout the sub-microstructure portion 804. As can be seen in the view of FIG. 8C, microstructure ridges (e.g., riblet ridges) 808 extend across the sub-microstructure portions 804, 806 and the relatively flat portion 802 and, thus, the microstructure ridges 808 of the illustrated example are not interrupted as the ridges 808 extend through the sub-microstructure portions 804, 806 and/or the relatively flat portion 802.

Figure 8D:
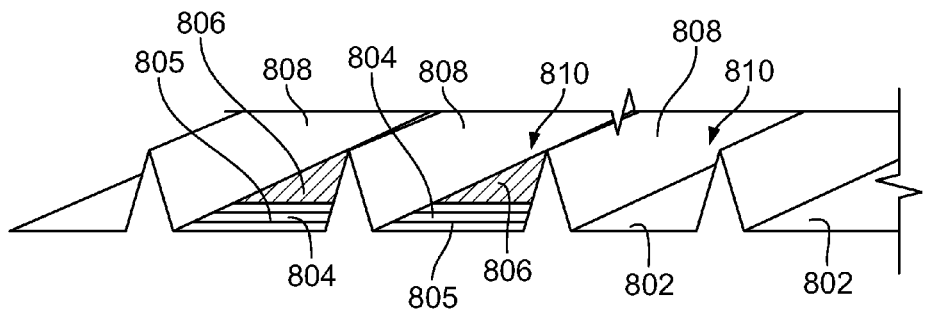
FIG. 8D is a detailed isometric view of the example indicia of FIGS. 8A-8C.

FIG. 8D is a detailed isometric view of the example indicia 800 of FIGS. 8A-8C. As can be seen in the view of FIG. 8D, base portions (e.g., base surfaces, valleys, etc.) 810 are located between the microstructure ridges 808. In this example, the sub-microstructure portions 804, 806 and the relatively flat portion 802 are superimposed on the base portions 810 and not on the ridges 808. Thus, in this example, sub-microstructures of the sub-microstructure portions 804, 806 do not extend onto the ridges 808. However, in other examples, sub-microstructures may superimposed onto the ridges 808 to achieve an optical effect (e.g., convey an image or indicia, a diffractive effect) and/or to reduce glint, for example. Additionally or alternatively, a combination of sub-microstructures superimposed on base portions as well as microstructures and/or microstructure features (e.g., microstructure ridges) is used to convey a representation of an image or indicia.

Figure 8E:
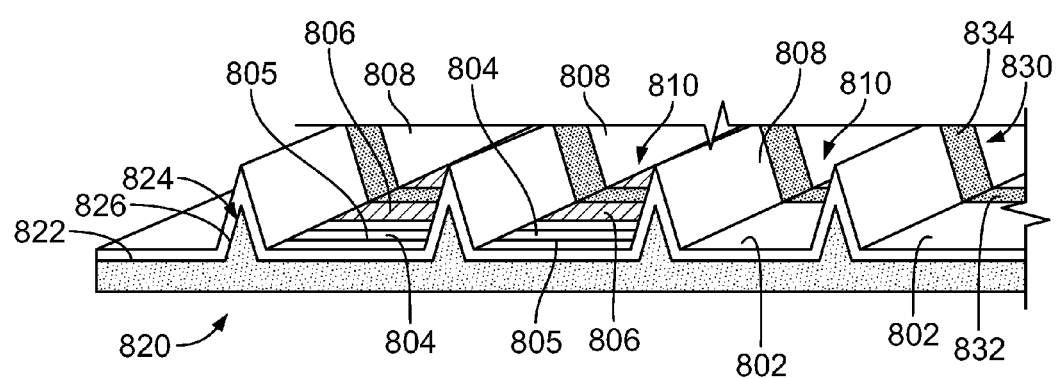
FIG. 8E illustrates the example indicia of FIGS. 8A-8D, but with an added color application, in accordance with the teachings of this disclosure.

FIG. 8E illustrates the example indicia 800 of FIGS. 8A-8D, but with an added color application 820, in accordance with the teachings of this disclosure. In this example, the color application 820 includes a base portion 822. In some examples, the color application 820 includes a protruding portion 824 having a decorative ridge surface 826 that defines a color application surface adjacent the microstructure ridges 808. Additionally or alternatively, a color application 830 is applied externally to define surface(s) 832 of the relatively flat portions 802 as well as surface(s) 834 on the microstructure ridges 808. In this example, the color applications 820, 830 are used to provide color and/or graphics to lettering and/or contrasting portions, for example, of the example indicia 800. In some examples, the color application 830 is only applied to the relatively flat portions 802 and still sufficient for marking readability to an observer.

In this example, the combination of the color applications 820, 830 along with the sub-microstructure portions 804, 806 and/or the ridges 805, which may be sub-microstructures, provide an enhanced visual effect to observers by enabling a customized look, color depth, and/or appearance that may convey a sense of depth and color ranges. The customized look may also include color that varies (e.g., changes, perceived to change, etc.) as a function of viewing angle. For example, this combination may allow a three-dimensional effect or diffractive effect to lettering of the indicia 800. In some examples, the color application 820 and/or the color application 830 include graphics that may be combined with reflectivity and/or directional control of reflections of the sub-microstructure portions 804, 806. In some examples, only one of the color application 830 or the color application 820 is applied. In some examples, the color application 830, which may include graphics, covers only a portion of the example indicia 800. Likewise, in some examples, the color application 820 may cover only a portion of the example indicia 800.

In some examples, the color applications 820 and/or 830 are defined by ink, dyes and/or dye infusions or any other appropriate type of colorant or color application. Additionally or alternatively, the relatively flat portion 802 and the sub-microstructure portions 804, 806 may be treated (e.g., corona treatment, plasma treatment, chemical etching, etc.) to facilitate better adhesion of ink for the color application 830, for example. In some examples, adhesion of ink to surfaces of the relatively flat portion 802 and/or the base portion 810, for example, may be facilitated by a focused plasma or laser where the sub-microstructures 806 are located, for example. In some examples, metallization may be used to provide a metallic look via sputter coating, for example. In particular, a metal coating may be applied to the sub-microstructure portions 804, 806 and/or other external surfaces on or proximate the example indicia 800. Additionally or alternatively, metallization may be applied on or embedded within a surface of the example indicia 800 and/or the sub-microstructures portions 804, 806 that at least partially define the example indicia 800.

Figure 9:
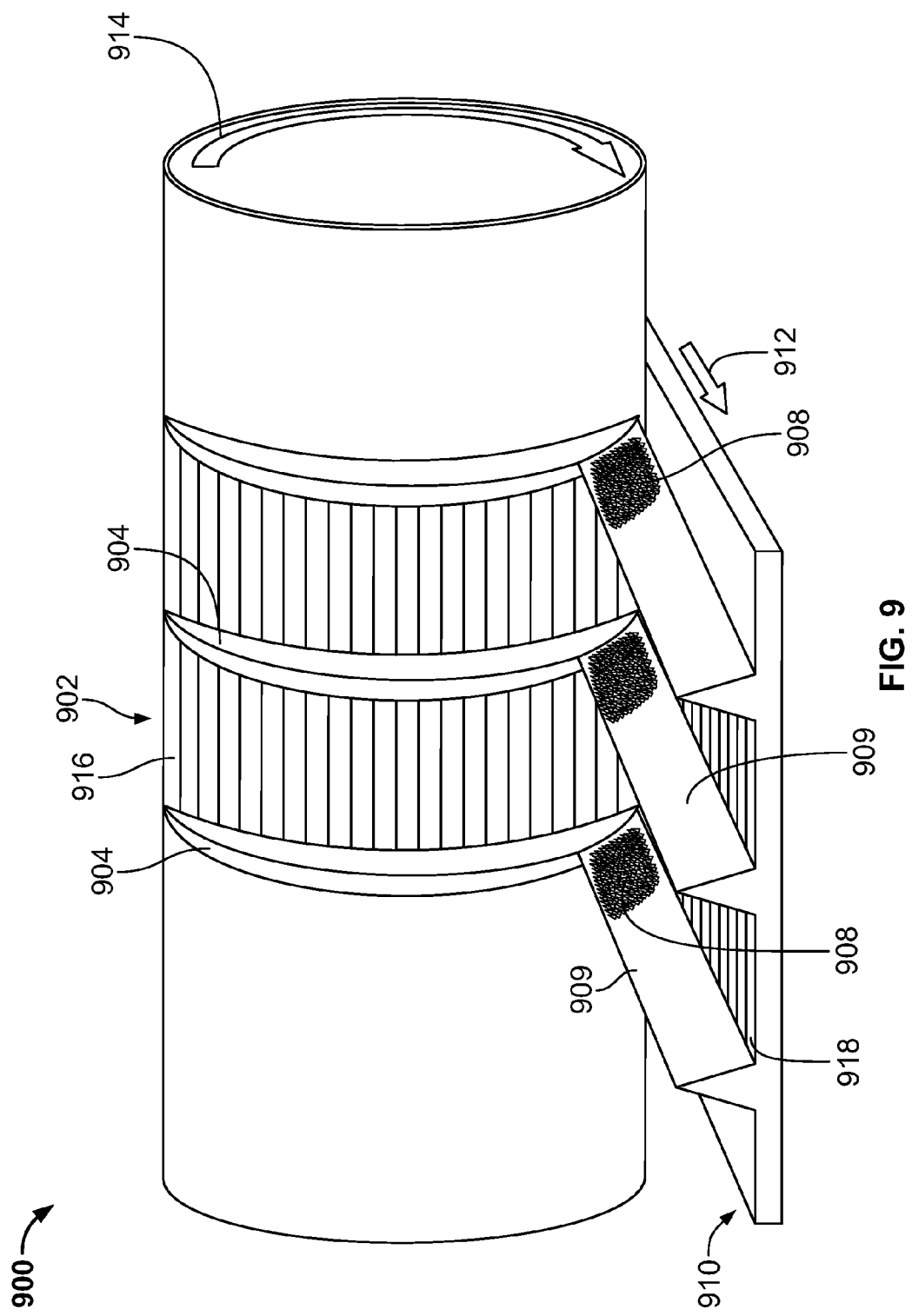
FIG. 9 illustrates an example roll-forming system that may be used to implement the examples disclosed herein.

FIG. 9 illustrates an example forming system 900, which uses roll-forming, that may be used to implement the examples disclosed herein. The example roll-forming system 900 includes a roller 902 with sub-microstructure forming grooves 904. In the illustrated example of FIG. 9, the roll-forming system 900 is being used to form (e.g., emboss) sub-microstructures (e.g., motheye sub-microstructures, sub-microstructure ridges, etc.) 908 onto ridges 909 of a microstructure (e.g., a riblet) 910. In this example, the roll forming system 900 may be used to form multiple sub-microstructure groups onto the microstructure 910 as shown above in connection with the example indicia 800 of FIG. 8.

During operation of the roll-forming system 900, the microstructure 910 moves in a direction generally indicated by an arrow 912 while the roller 902 rotates in a direction generally indicated by an arrow 914. In this example, motheye forming structures to form the sub-microstructures 908 on the ridges 909 are within the grooves 904 (e.g., tooling shapes and/or geometry used to form the sub-microstructures 908), which also have complementary indentations to receive the ridges 909. The motheye forming structures in the grooves 904 may vary in size to form smaller sub-microstructures near the tip of the microstructure ridges 909 while forming larger sub-microstructures elsewhere on the microstructure ridges 909, for example (see FIG. 3). In some examples, a force applied to the microstructure 910 via the roller 902 is adjusted to alter a degree to which the sub-microstructures 908 are formed onto the microstructure 910. Additionally or alternatively, a line speed at which the microstructure 910 moves relative to the machining system 900 and/or a rotational speed of the roller 902 is adjusted to control the process of forming the sub-microstructures 908 on the microstructure 910 and/or a degree to which the sub-microstructures 908 are formed on the microstructure 910. In some examples, the roller surface 902 may have structures 916 to form (e.g. emboss) sub-microstructures (e.g., ridges) into microstructure base areas 918 between the microstructure ridges 909.

Figure 10:
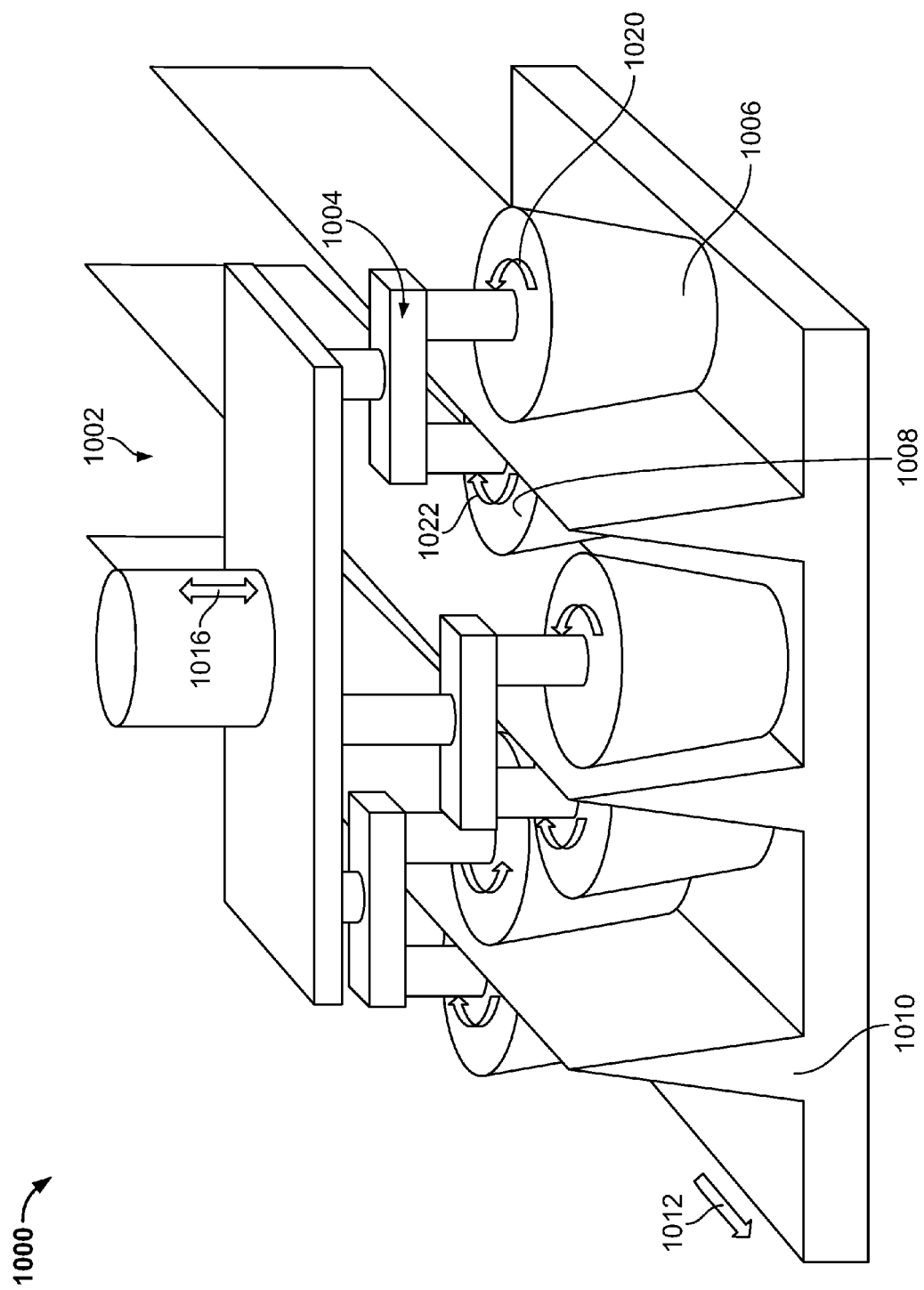
FIG. 10 illustrates an example embossing system that may be used to implement the examples disclosed herein.

FIG. 10 illustrates an example forming system 1000 that may also be used to implement the examples disclosed herein. The example forming system 1000 includes an embossing rig 1002 on which alignment fixtures 1004 are mounted. The fixtures 1004 each have forming rollers (e.g., tapered embossing rollers) 1006, 1008 to form (e.g., emboss) sub-microstructures onto a microstructure 1010.

In operation, the forming system (e.g., a secondary process system) 1000 of the illustrated example forms the sub-microstructures onto the microstructure 1010 as the microstructure 1010 is extruded in a direction generally indicated by an arrow 1012. In this example, the microstructure 1010 is a riblet (e.g., a riblet substrate) that is extruded. During operation of the embossing rig 1002, the embossing rig 1002 may move in an upward or downward direction generally indicated by a double arrow 1016. To form and/or add the sub-microstructures and/or sub-microstructure groups onto the microstructure 1010, the rollers 1006, 1008 of the illustrated example rotate in direction generally indicated by arrows 1020, 1022, respectively.

Figure 11:
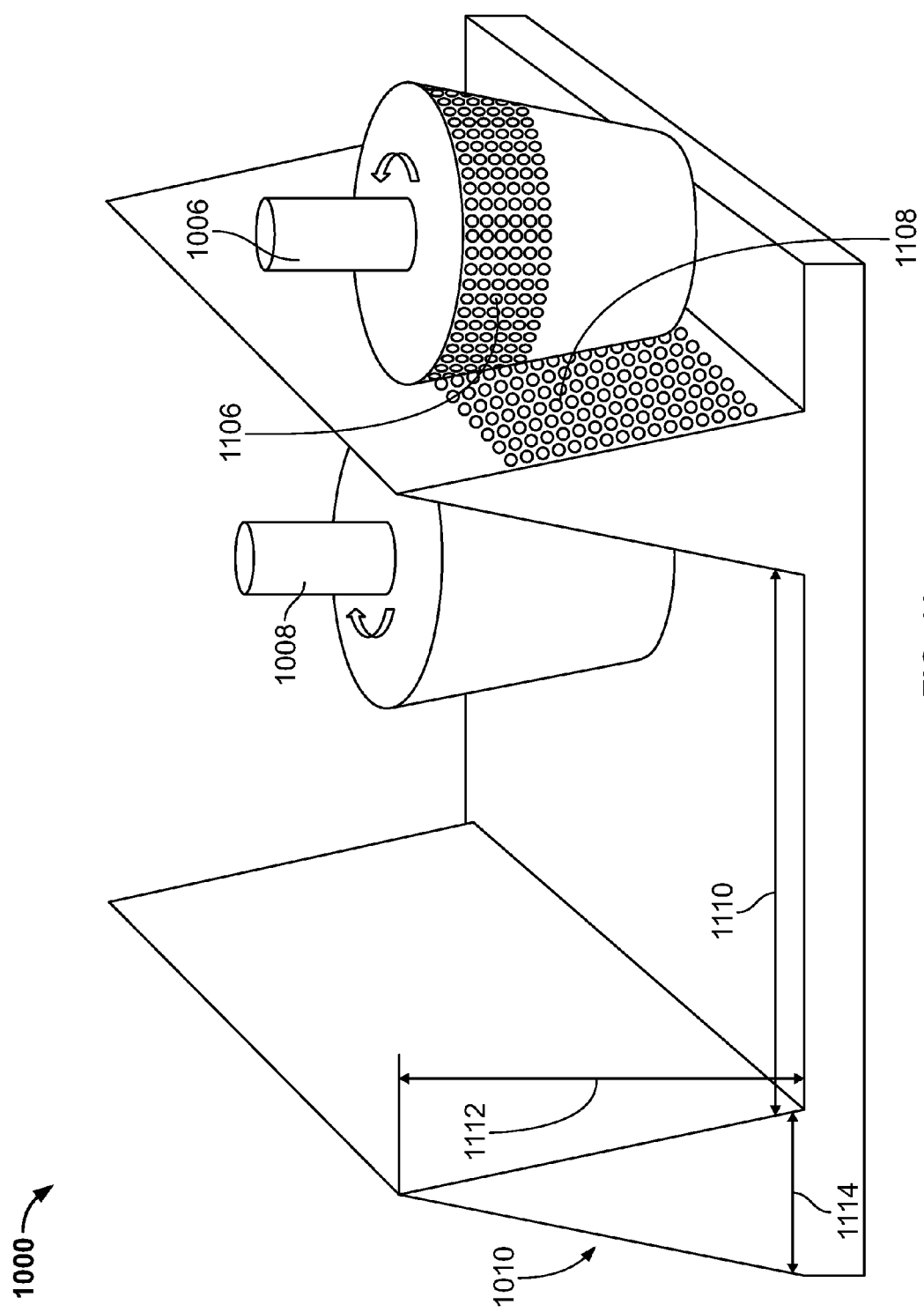
FIG. 11 is a detailed view of the example embossing system of FIG. 10.

FIG. 11 is a detailed view of the example forming system 1000 of FIG. 10. As mentioned above, the example rollers 1006, 1008 form sub-microstructures onto the microstructure 1010. During rotation of the rollers 1006, 1008 and as the microstructure 1010 moves relative to the rollers 1006, 1008, surface features 1106 are used to emboss sub-microstructures 1108 on the microstructure 1010. In particular, the surface features 1106 may include motheye sub-microstructures and/or motheye-forming structures or any other appropriate sub-microstructure-forming structures (e.g. ridges) to emboss the sub-microstructures 1108 onto the microstructure 1010. In some examples, heights of the sub-microstructures 1108 may vary along an extruded depth of the microstructure 1010 by moving the rollers 1006, 1008 (e.g., upward or downward, sideways) or varying the pressure relative to the microstructure 1010 as the microstructure 1010 moves relative to the forming system 1000. In this example, each ridge of the microstructure 1010 is separated by approximately 50-100 microns, as indicated by a dimension 1110, each ridge height is approximately 30-60 microns, as indicated by a dimension 1112, and each ridge is approximately 5-30 microns wide at the base, as indicated by a dimension 1114. In this example, spacing between peaks of each ridge of the microstructure 1010 is approximately 75-100 microns. The aforementioned dimensions and/or parameters are only examples and may vary by application, fluid properties of a fluid in which a vehicle is travelling through and/or predicted environmental operating conditions, etc.

Figure 12A:
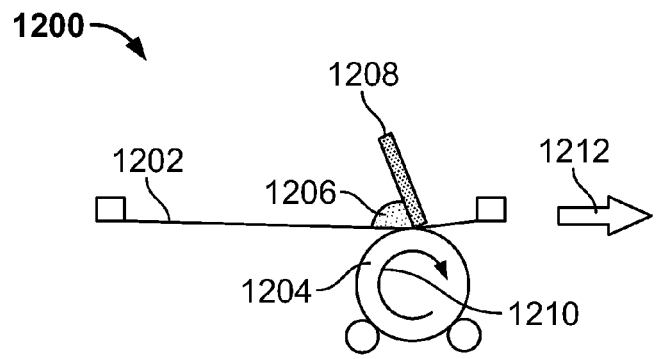
FIGS. 12A-12C illustrate example cylindrical printing methods that may be used to implement the examples disclosed herein.
Figure 12B:
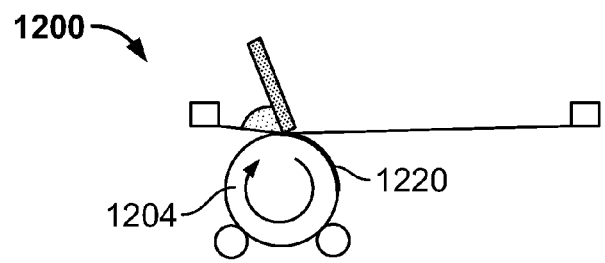
Figure 12C:
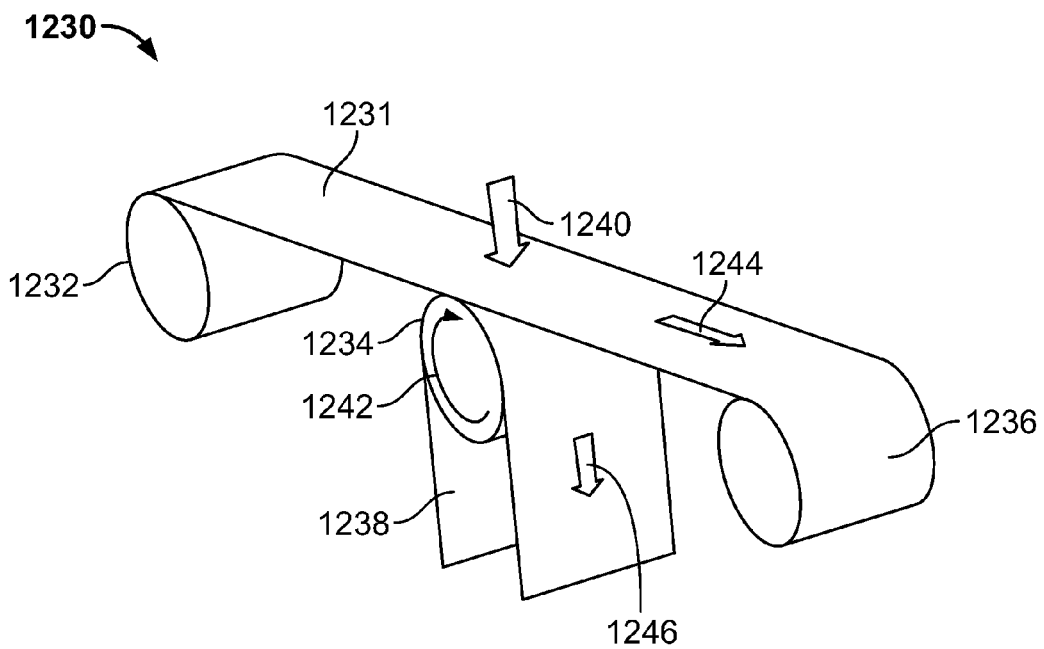

FIGS. 12A-12C illustrate example cylindrical printing methods that may be used to implement the examples disclosed herein. FIG. 12A illustrates an example cylindrical printing apparatus 1200, which may be used to print to a riblet or an applique to provide a color application to the riblet. The example cylindrical printing apparatus 1200 includes a screen 1202, a cylinder 1204, ink (e.g., ink deposited onto the screen 1202) 1206, and an ink director 1208.

In operation, when the ink is applied to the screen 1202, which may have openings and/or perforations representing a pattern or image to be printed, the roller 1204 spins in a direction generally indicated by an arrow 1210, and the screen 1202 is moved in a direction generally indicated by an arrow 1212, thereby allowing the ink 1206 to transfer to the cylinder 1204 via portions of the screen 1202.

FIG. 12B illustrates the example printing apparatus 1200 at a different time from that shown in FIG. 12A. In this example, the screen 1202 has displaced relative to the cylinder 1204 as the cylinder 1204 spins, thereby resulting in applied ink 1220 on a surface of the cylinder 1204 as the cylinder 1204 rotates. In this example, the cylinder 1204 with the applied ink 1220 is used to print a graphic set for an aircraft. In this example, the graphic set is an applique to be applied to an aircraft. In some examples, the example printing apparatus 1200 is used to print to applique that may be applied to a bottom surface (e.g., a mounting surface), a base surface and/or any external surface of a riblet. In some examples, the screen 1202 moves in a reciprocal motion to reset the screen 1202 relative to the cylinder 1204 for additional printing and/or to reset the printing process.

FIG. 12C depicts another example cylindrical printing apparatus 1230. In contrast to the example print apparatus 1200 described above in connection with FIGS. 12A and 12B, the example cylindrical printing apparatus 1230 has a continuous screen 1231 instead of a relatively limited size screen such as the screen 1202. The example printing apparatus 1230 includes the screen 1231, a supply roll 1232 of the screen 1231, an applique cylinder 1234, a takeup roll 1236 of the screen 1231, and an applique 1238 to be printed thereon.

In operation, ink, dye and/or any appropriate colorant is applied to the screen in a direction generally indicated by an arrow 1240. In this example, the applique 1238 is placed between the applique roller 1234 and the screen 1231. The applique roller 1234 rotates in a direction generally indicated by an arrow 1242 while the screen 1231 is taken from the supply roll 1232 and moves in a direction generally indicated by an arrow 1244 to be placed on the takeup roll 1236. As the ink is applied to the screen 1231, the applique 1238 is then provided with that ink while the applique 1238 passes and/or contacts the screen 1231, and moves in a direction generally indicated by an arrow 1246 after being printed. After the applique 1238 has been provided with the ink, the applique 1238 can be used to provide graphics to a microstructure (e.g., on a mounting surface of a clear microstructure, on an external surface of the microstructure, etc.). In some examples, numerous graphics sets and/or appliques are made continuously (e.g., from a single supply roll 1232).

In some examples, silk screen inks and/or other printing processes using spray, ink jets, gravure or slot dies may be used, thereby allowing a continuous color coating process to be implemented with designs and/or patterns that are varied extensively (e.g., a repetition of design is not necessary, a screen roll may be used for multiple graphics sets, etc.).

Figure 13:
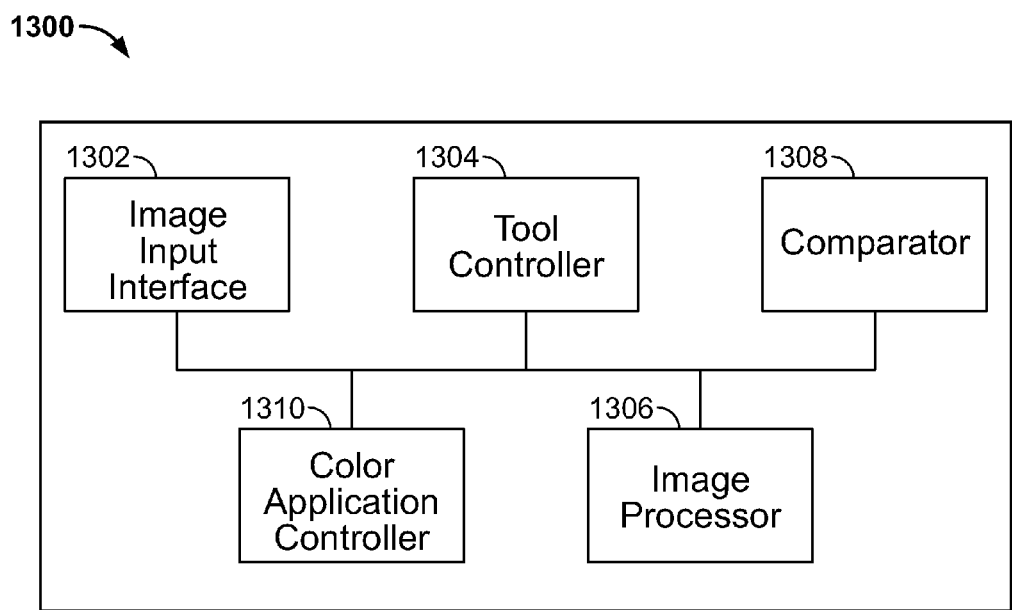
FIG. 13 is a schematic diagram of a system that may be used to implement the examples disclosed herein.

FIG. 13 is a schematic representation of a sub-microstructure imaging system 1300 that may be used to create optical/aesthetic/color effects and/or an image placement (e.g., placement of a color representation of the image) on a microstructure and/or a surface with multiple microstructures. The example sub-microstructure imaging system 1300 includes an example image input interface 1302, an example tool controller 1304, an example image processor 1306, an example comparator 1308 and a color application controller 1310. In this example, the microstructure imaging system 1300 is used to place and/or define an image (e.g., a color image) on a microstructure by defining patterns of sub-microstructures and/or multiple groups of sub-microstructures, and/or directing placement of a color application, for example.

The image input interface 1302 of the illustrated example is used to receive an image and/or an image file (e.g., a JPEG file) that may have color data (e.g., color placement information, etc.) and/or define color application parameters. In this example, the image processor 1306 receives the image and/or the image file from the image input interface 1302 and maps and/or defines where sub-microstructure, groups of sub-microstructures are to be positioned on, formed or shaped, and/or color application placement or definition to create an optical effect (e.g., convey a representation of the image from the microstructure). In some examples, the image input interface 1302 may define the positioning and/or relative positioning of sub-microstructure groups to one another, thereby creating perceived depth to an observer. In this example, the image processor 1306 provides a mapping and/or defined sub-microstructure group placement(s) to the tool controller 1304 so that the tool controller 1304 may be used to provide (e.g., superimpose) sub-microstructures (e.g., emboss sub-microstructures, direct a tool, etc.) onto a microstructure and/or a surface with multiple microstructures to create an optical effect and/or an image thereon that may be viewed by an observer.

In some examples, a comparator 1308 verifies the sub-microstructures provided via the tool controller 1304 by visual inspection using a camera, for example. In particular, the comparator 1308 may use an image provided to the image input interface 1302 to a detected image of a microstructure, for example, to verify that a representation of an image is provided by the microstructure via placement of the sub-microstructures on the microstructure. Additionally or alternatively, the comparator 1308 verifies a color application applied to a microstructure.

In this example, the color application controller 1310 defines and/or directs placement of a color applique, for example. Additionally or alternatively, the color application controller 1310 defines how a color texture, surface and/or graphics are to be applied to a microstructure. In some examples, the color application controller 1310 determine how different color portions are to be arranged (e.g., which colors are placed on which surfaces and/or layers).

Figure 14:
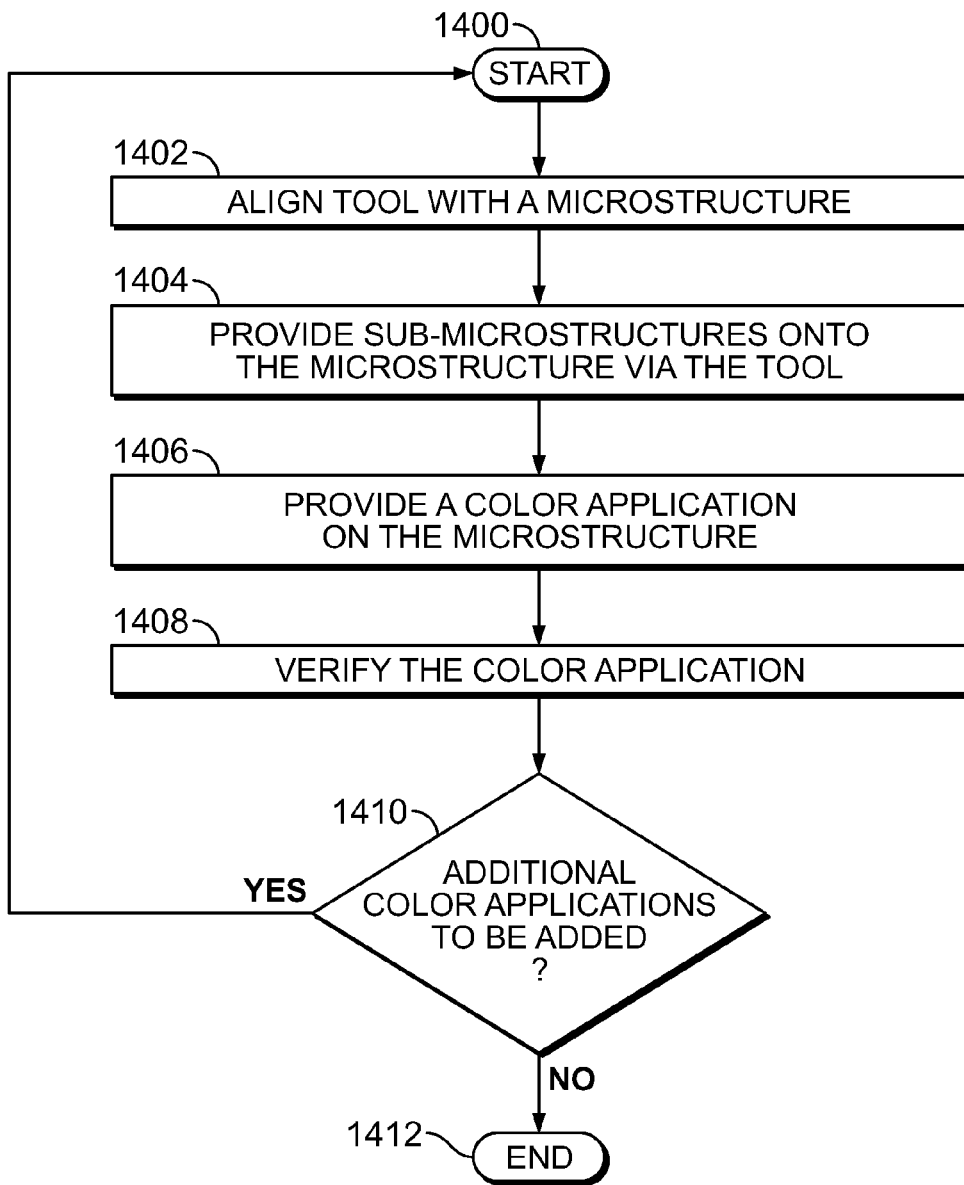
FIG. 14 is a flowchart representative of an example method that may be used to implement the examples disclosed herein.
Figure 15:
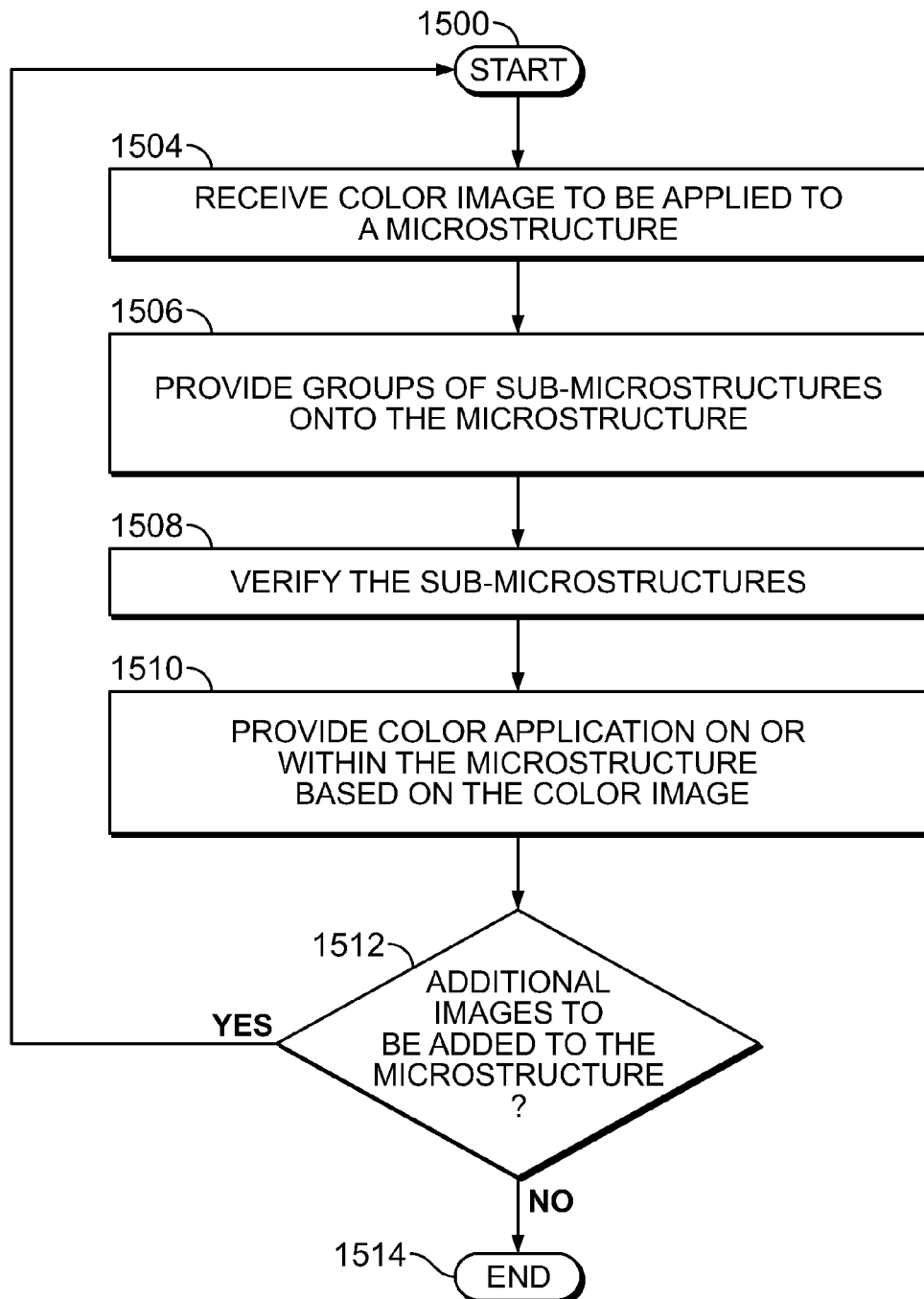
FIG. 15 is a flowchart representative of another example method that may be used to implement the examples disclosed herein.

While an example manner of implementing the sub-microstructure imaging system 1300 of FIG. 13 is illustrated in FIGS. 14 and 15, one or more of the elements, processes and/or devices illustrated in FIG. 13 may be combined, divided, re-arranged, omitted, eliminated and/or implemented in any other way. Further, the example image input interface 1302, the example tool controller 1304, the example image processor 1306, the example comparator 1308, the example color application controller 1310 and/or, more generally, the example sub-microstructure imaging system 1300 of FIG. 13 may be implemented by hardware, software, firmware and/or any combination of hardware, software and/or firmware. Thus, for example, any of the example image input interface 1302, the example tool controller 1304, the example image processor 1306, the example comparator 1308, the example color application controller 1310 and/or, more generally, the example sub-microstructure imaging system 1300 of FIG. 13 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, image input interface 1302, the example tool controller 1304, the example image processor 1306, the example comparator 1308, and/or the example color application controller 1310 is/are hereby expressly defined to include a tangible computer readable storage device or storage disk such as a memory, a digital versatile disk (DVD), a compact disk (CD), a Blu-ray disk, etc. storing the software and/or firmware. Further still, the example microstructure imaging system 1300 of FIG. 13 may include one or more elements, processes and/or devices in addition to, or instead of, those illustrated in FIGS. 14 and 15, and/or may include more than one of any or all of the illustrated elements, processes and devices.

Flowcharts representative of example methods for implementing the sub-microstructure imaging system 1300 of FIG. 13 are shown in FIGS. 14 and 15. In these examples, the methods may be implemented by using machine readable instructions that comprise a program for execution by a processor such as the processor 1612 shown in the example processor platform 1600 discussed below in connection with FIG. 16. The program may be embodied in software stored on a tangible computer readable storage medium such as a CD-ROM, a floppy disk, a hard drive, a digital versatile disk (DVD), a Blu-ray disk, or a memory associated with the processor 1612, but the entire program and/or parts thereof could alternatively be executed by a device other than the processor 1612 and/or embodied in firmware or dedicated hardware. Further, although the example program is described with reference to the flowcharts illustrated in FIGS. 14 and 15, many other methods of implementing the example sub-microstructure imaging system 1300 may alternatively be used. For example, the order of execution of the blocks may be changed, and/or some of the blocks described may be changed, eliminated, or combined.

As mentioned above, the example methods of FIGS. 14 and 15 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 14 and 15 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 14 is a flowchart representative of an example method that may be used to implement the examples disclosed herein. The example method begins at block 1400 where a microstructure (e.g., the microstructures 300, 400, 600, 700, 1010) is being formed (e.g., extruded and/or machined) and prepared to receive sub-microstructures and/or multiple sub-microstructure groups superimposed onto one or more surfaces of the microstructure and a corresponding color application that conveys a representation of an image, which may be perceived by a person and/or received by an image input interface such as the image input interface 1302 of FIG. 13 (block 1400).

A tool is aligned with a microstructure and/or a surface of the microstructure based on data from an image processor such as the image processor 1306 of FIG. 13 (block 1402). For example, a roll forming cylinder such as the roller 902 is aligned to the microstructure (e.g., the microstructure 906) by a tool controller such as the tool controller 1304 of FIG. 13. The tool of the illustrated example may be aligned through visual means and/or mechanical biasing (e.g., spring loaded against the microstructure as it is being extruded, etc.). In some examples, the microstructure is moved and/or positioned to be properly aligned relative to the tool. In other examples, machining rollers (e.g., the rollers 1006, 1008) of an embossing rig such as the embossing rig 1002 are aligned via visual and/or mechanical means to a microstructure as the microstructure is being extruded (e.g., an inline secondary process to form the sub-microstructures).

Next, in this example, the tool provides a first group of sub-microstructures onto the microstructure (block 1404). In this example, the first group of sub-microstructures is formed on the microstructure by embossing. In some examples, a force placed on an embossing tool is varied to adjust the degree to which the microstructure is embossed and/or embossed at different locations of the microstructure. In some examples, a line speed of the microstructure and/or a rotational speed of an embossing roller (e.g., the roller 902) is varied to control the degree to which sub-microstructures are provided to the microstructure at different locations of the microstructure, for example.

Next, a color application is provided on the microstructure by a color application controller such as the color application controller 1310 described above in connection with FIG. 13 (block 1406). For example, the color application controller 1310 may determine which layers and/or portions of the microstructure and/or multiple microstructures will have a color application applied to convey the image. Once, the color application has been provided, the color application is verified (block 1408). In some examples an image processor such as the image processor 1306 in conjunction with an imaging system and/or a camera system, for example, performs this verification.

Next, it is determined whether additional color applications are to be added (block 1410). This determination may occur by determining how much of the microstructure needs to be provided with additional color application(s) to convey an image, for example. In particular, a comparator such as the comparator 1308 may be used to compare the colors present on the microstructure via a camera system, for example, to the image to determine if additional color layers groups need to be added. Additionally or alternatively, the comparator may determine if additional sub-microstructures and/or sub-microstructure groups are to be added. If additional color applications are to be added (block 1410), the process repeats and control returns to the block 1400. If additional color applications are not to be added (block 1410), the process ends (block 1412).

FIG. 15 is another flowchart representative of another example method that may be used to implement the examples disclosed herein. The process begins at block 1500 where an image (e.g., a color image representing a logo) is to be represented by a surface having microstructures along with portions that are relatively flat. First, the image to be applied to the surface is received by an image interface such as the image input interface 1302 described above in connection with FIG. 13 (block 1504). Next, groups of sub-microstructures (e.g., a pattern of sub-microstructures) are provided onto or proximate the surface based on instructions from an image processor such as the image processor 1306 and/or a tool controller such as the tool controller 1304 of FIG. 13 (block 1506).

The sub-microstructures and/or the sub-microstructure groups are verified (1508). In some examples, an inspection system such as a camera-based system verifies that the sub-microstructures and/or sub-microstructure groups are properly provided to the microstructure (e.g., by visual verification). Additionally or alternatively, the degree to which the sub-microstructures have been provided (e.g., embossed) onto the surface is determined and/or verified (e.g., surface area of the microstructure covered, height and/or depth of the sub-microstructures, etc.).

Based on the image a color application is then provided on or within one or the microstructure (block 1510). In particular, a color texture may be provided (e.g., printed) to the microstructure and/or an applique may be applied to the microstructure to provide the color application by a color application controller such as the color application controller 1310 of FIG. 13. In some examples, the color texture may be applied as sub-microstructures (e.g., colored sub-microstructures, sub-microstructures located at an interface or layer of the microstructure). In some examples, a surface of the microstructure is printed (e.g., directly printed) via a cylindrical printing apparatus such as those shown in FIGS. 12A-12C, for example, or any other appropriate printing process (e.g., inkjet, etc.).

Next, it is determined whether additional images, portions of images and/or color application portions are to be provided to the surface (block 1512). This determination may occur by determining how much of the microstructure needs to be provided with sub-microstructures and/or color applications to convey an image, for example. In particular, a comparator such as the comparator 1308 may be used to compare the sub-microstructures, visible color and/or color applications present to an image to determine if additional images and/or color applications need to be added to the surface. If additional images or portions of images are to be added to the surface (block 1512), the process repeats and control returns to block 1500. If additional images are not to be added to the surface (block 1510), the process ends (block 1514).

Figure 16:
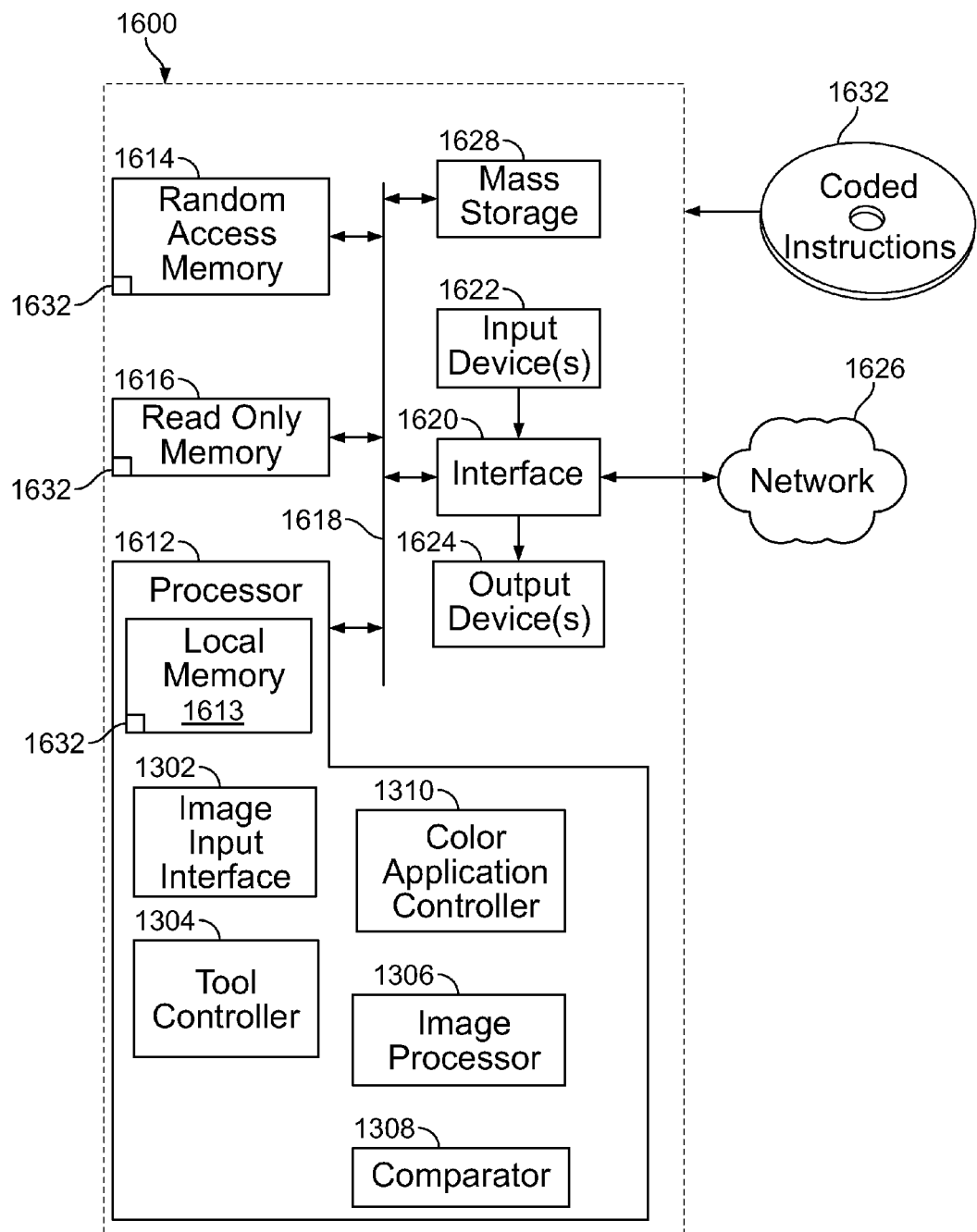
FIG. 16 is a block diagram of an example processor platform capable of executing machine readable instructions to implement the example methods of FIGS. 14 and 15.

FIG. 16 is a block diagram of an example processor platform 1600 capable of executing instructions to implement the methods of FIGS. 14 and 15 to implement the sub-microstructure imaging system 1300 of FIG. 13. The processor platform 1600 can be, for example, a server, a personal computer, a mobile device (e.g., a cell phone, a smart phone, a tablet such as an iPad™), a personal digital assistant (PDA), an Internet appliance, a digital video recorder, a set top box, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors or controllers from any desired family or manufacturer.

The processor 1612 of the illustrated example includes a local memory 1613 (e.g., a cache). In this example, the processor 1612 also includes the image input interface 1302, the tool controller 1304, the image processor 1306, the comparator 1308 and the color application controller 1310. The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device(s) 1622 permit(s) a user to enter data and commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1524 can be implemented, for example, by display devices (e.g., a light emitting diode (LED), an organic light emitting diode (OLED), a liquid crystal display, a touchscreen, a tactile output device, a printer and/or speakers). The interface circuit 1620 of the illustrated example, thus, typically includes a graphics driver card, a graphics driver chip or a graphics driver processor.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.).

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, RAID systems, and digital versatile disk (DVD) drives.

Coded instructions 1632 to implement the methods of FIGS. 14 and 15 may be stored in the mass storage device 1628, in the volatile memory 1614, in the non-volatile memory 1616, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While aircraft are described, the example methods and apparatus may be applied to other vehicles, watercraft, aerodynamic structures, etc.

What is claimed is:

1. An apparatus comprising:
   an at least partially transparent aerodynamic microstructure of a vehicle;
   sub-microstructures superimposed on the aerodynamic microstructure; and
   a color application including a color sub-layer disposed below the aerodynamic microstructure, wherein the color sub-layer is textured at an interface between the color sub-layer and an adjacent surface of the aerodynamic microstructure.

2. The apparatus as defined in claim 1, wherein the color sub-layer is embedded within the aerodynamic microstructure.

3. The apparatus as defined in claim 1, further including an ink or dye that is applied to an external surface of the aerodynamic microstructure.

4. The apparatus as defined in claim 1, wherein spacing between the sub-microstructures is less than about 0.4 microns.

5. The apparatus as defined in claim 1, wherein the color sub-layer includes an applique defining an image.

6. The apparatus as defined in claim 1, wherein the color sub-layer extends from the color sub-layer to ridges of the aerodynamic microstructure.

7. The apparatus as defined in claim 1, further including a colored portion embedded within the aerodynamic microstructure and above the color sub-layer.

8. The apparatus as defined in claim 1, wherein the sub-microstructures include distinct sub-microstructure groups that vary in at least one of sub-microstructure shape or size.

9. An apparatus comprising:
   an at least partially transparent aerodynamic microstructure of a vehicle;
   sub-microstructures superimposed on the aerodynamic microstructure; and
   a color application including a color sub-layer disposed below the aerodynamic microstructure, wherein the color sub-layer extends into an external ridge of the aerodynamic microstructure.

10. The apparatus as defined in claim 9, wherein the color sub-layer is textured at an interface between the color sub-layer and an adjacent surface of the aerodynamic microstructure.

11. A method comprising:
    maneuvering a vehicle, wherein sub-microstructures are superimposed on an at least partially transparent aerodynamic microstructure of the vehicle, wherein a color application includes a color sub-layer that is below the aerodynamic microstructure, and wherein the color sub-layer is textured at an interface between the color sub-layer and an adjacent surface of the aerodynamic microstructure.

12. The method as defined in claim 11, wherein the sub-microstructures are machined onto the aerodynamic microstructure.

13. The method as defined in claim 11, wherein distances between the sub-microstructures are less than about 0.4 microns.

14. The method as defined in claim 11, further including a color layer, dye or ink that is applied to an external surface of the aerodynamic microstructure.

15. A method comprising:
   providing sub-microstructures on an at least partially transparent aerodynamic microstructure of a vehicle; and
   providing a color application including a color sub-layer to a surface embedded within the aerodynamic microstructure, wherein the color sub-layer is textured at an interface between the color sub-layer and an adjacent surface of the aerodynamic microstructure.

16. The method as defined in claim 15, wherein distances between the sub-microstructures are between about 0.4 and 0.7 microns.

17. The method as defined in claim 15, further including ink or dye that is applied to an external surface of the aerodynamic microstructure.

18. The method as defined in claim 15, wherein the surface includes a bottom surface of the aerodynamic microstructure, and wherein providing the color application comprises applying an applique to provide an image to the bottom surface of the aerodynamic microstructure.

19. The method as defined in claim 18, wherein the applique is printed by cylindrical printing.

20. The method as defined in claim 15, wherein the surface comprises a bottom surface of the aerodynamic microstructure, the color application to be positioned adjacent to a vehicle surface.

\* \* \* \* \*